(12) United States Patent
Keshtkarjahromi

(10) Patent No.: US 11,425,164 B2
(45) Date of Patent: *Aug. 23, 2022

(54) DISTRIBUTED SECURE EDGE HETEROGENEOUS STORAGE NETWORK WITH BYZANTINE ATTACK RESILIENCE

(71) Applicant: Seagate Technology LLC, Fremont, CA (US)

(72) Inventor: Yasaman Keshtkarjahromi, Shakopee, MN (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 201 days.

This patent is subject to a terminal disclaimer.

(21) Appl. No.: 17/006,394

(22) Filed: Aug. 28, 2020

(65) Prior Publication Data

US 2022/0070210 A1    Mar. 3, 2022

(51) Int. Cl.
*H04L 9/40*  (2022.01)
*G06F 21/64*  (2013.01)

(52) U.S. Cl.
CPC .......... *H04L 63/1475* (2013.01); *G06F 21/64* (2013.01)

(58) Field of Classification Search
CPC ....... H04L 63/1475; H04L 9/00; H04L 63/12; G06F 21/64; G06F 21/6218
See application file for complete search history.

(56) References Cited

U.S. PATENT DOCUMENTS

| | | | |
|---|---|---|---|
| 8,706,914 B2 | 4/2014 | Duchenseau | |
| 10,536,167 B2 | 1/2020 | Pavlov et al. | |
| 2003/0081790 A1* | 5/2003 | Kallahalla | H04L 9/088 380/281 |
| 2011/0016316 A1 | 1/2011 | Amir et al. | |
| 2017/0293766 A1* | 10/2017 | Schnjakin | H04L 63/102 |
| 2019/0109366 A1* | 4/2019 | Cheng | H01Q 1/243 |
| 2019/0207910 A1* | 7/2019 | Darling | H04L 63/0428 |
| 2020/0162264 A1 | 5/2020 | Zamani et al. | |

OTHER PUBLICATIONS

Haddock, J., Needell, D.: Randomized projections for corrupted linear systems. In: Proc. 15th Int. Conf. of Numerical Analysis and Applied Mathematics (2017), https://www.math.ucla.edu/~jhaddock/Slides/ MotzandRKCorr/ICNAAM2017.pdf.
J. Moorman, Th. Tu, D.M., Needell, D.: Randomized kaczmarz with averaging. http://eceweb1.rutgers.edu/~csi/denali.pdf.

* cited by examiner

*Primary Examiner* — Farid Homayounmehr
*Assistant Examiner* — Suman Debnath
(74) *Attorney, Agent, or Firm* — Holzer Patel Drennan

(57) ABSTRACT

Distributed storage of a file in edge storage devices that is resilient to eavesdropping adversaries and Byzantine adversaries. Approaches include a cost-efficient approach in which an authorized user has access to the content of all edge storage nodes. In this approach, key blocks and file blocks that are masked with key blocks are saved in the edge storage nodes. Additionally, redundant data for purposes of error correction are also stored. In turn, upon retrieval of all blocks, errors introduced by a Byzantine adversary may be corrected. In a loss resilient approach, redundant data is stored along with masked file partitions. Upon retrieval of blocks from the edge storage nodes, a unique approach to solving for the unknown file partition values is applied with identification of corrupt nodes based on an average residual error value for each storage node.

21 Claims, 13 Drawing Sheets

Algorithm 1 Group Kaczmarz

1: procedure GK($A, b, k, k_b, d, \mathcal{J}_i, \forall i = 1, ..., N$)
2:     $\mathcal{S} = \emptyset$
3:     while $|\mathcal{S}| < k_b Z_b$ do
4:         $x_k = k^{th}$ iterate produced by Randomized Kaczmarz with the initial vector $x_0 = 0$ and $A, b$.
5:         Define Res as a vector with $N$ elements
6:         for $i = 1 : N$ do
7:             Res$(i) = \text{mean}_{j \in \mathcal{J}_i}(|A_j x_k - b_j|)$
8:         $\mathcal{I} =$ indices of $d$ largest elements of Res
9:         $\mathcal{S} = \mathcal{S} \cup \mathcal{I}$
10:     $\mathcal{D} = \{\mathcal{J}_i, i \in \mathcal{I}\}$
11:     Remove rows of matrix $A$ and elements of vector $b$ with the indices determined in the set $\mathcal{D}$, i.e., $A = A_{\mathcal{D}^c}$ and $b = b_{\mathcal{D}^c}$.
12:     return $x$, where $x$ is the result of applying Randomized Kaczmarz on $A$ and $b$.

FIG. 7

Algorithm 2 Retrieving Data in Robusified Edge-Failure/Loss Resilient SHADES 1: $MAF1 = \infty$
2: Select $t - \epsilon$ random storage nodes and apply GK
3: Calculate the mean absolute logarithmic over the decoded file partitions
4: while $(MAF1 - MAF2) > \delta$ do
5:     Select one more storage node randomly among those which are not selected and apply GK on the packets of all packets received from the selected storage nodes.
6:     $MAF1 = MAF2$
7:     Calculate the average of absolute values of the file partitions and store the calculated value in parameter $MAF2$
8: Return the latest obtained values of file partitions

FIG. 10

DISTRIBUTED SECURE EDGE HETEROGENEOUS STORAGE NETWORK WITH BYZANTINE ATTACK RESILIENCE

CROSS-REFERENCE TO RELATED APPLICATIONS

The present application is related to U.S. patent application Ser. No. 16/669,696 filed 31 Oct. 2019 entitled "DISTRIBUTED SECURE EDGE STORAGE NETWORK UTILIZING COST FUNCTION TO ALLOCATE HETEROGENEOUS STORAGE" and U.S. patent application Ser. No. 16/669,712 filed 31 Oct. 2019 entitled "DISTRIBUTED SECURE EDGE STORAGE NETWORK UTILIZING REDUNDANT HETEROGENEOUS STORAGE," which are specifically incorporated by reference for all that they disclose and teach.

BACKGROUND

The present disclosure generally relates to distributed data storage systems. Due to, among other things, the widespread adoption of mobile devices and the "Internet of things" (IoT), data is being generated exponentially. It is estimated by one source that data creation will grow to an enormous 163 zettabytes by 2025, which is ten times the amount of data created in 2017. This stored data can include large amounts of automatically generated data, e.g., data generated by sensors. The sensor data may include the raw data captured by end devices as well as the data generated as the result of analyzing the raw data. One solution for storing and analyzing large amounts of data involves transferring it to large data centers, which is commonly referred to as cloud storage.

Assuming network traffic grows exponentially, it may become increasingly difficult to send all of the created data to cloud for storage, especially for time-critical applications. In some emerging technologies, such as smart cities and autonomous cars, the data may need to be analyzed and stored in real-time, which may be difficult to do in the cloud. Among other things, cloud computing may be affected by relatively high latency (e.g., the cloud storage facility may be located a long distance from where the data is generated) as well as due to unpredictability of network connections (e.g., due to spikes in demands, outages, etc.).

SUMMARY

The present disclosure presents approaches secure distributed heterogeneous edge storage that provides resiliency against eavesdropping attacks and Byzantine attacks for storage of a file in the distributed edge storage nodes. In one aspect, a file is partitioned, keys are generated, and packets comprising file information masked by the keys are stored in the distributed nodes. Furthermore, additional data is generated that may be used for error correction in the event that one of the nodes is compromised by a Byzantine adversary. This approach includes selecting a value $Z_e$ such that an eavesdropping attacker having access to $Z_e$ storage nodes is unable to decode any partial information of a file of size $|F|$ stored in a network that distributedly stores the file in more than the $Z_e$ storage nodes. The approach also includes selecting a value $Z_b$ such that corrupted data packets from $Z_b$ storage nodes may be corrected by application of an error correction code to information stored in the storage nodes. The approach includes selecting N* of the storage nodes that minimizes a cost function that includes $|F|$, $Z_e$, $Z_b$, an initial data access cost $C_T$, and a transmission and downloading cost $C_d$. The error correction code may be based on $Z_b$ and $|F|$ for correcting errors from the retrieved information regarding the file F. Initially, equal memory sizes are allocated from the N* of the storage nodes to store the file, redundant error correction data, and a set of linear code keys. In turn, the approach includes iteratively determining a first cost of adding more storage nodes to the N* storage nodes and a second cost of allocating more memory from a subset of the N* storage nodes. The approach includes constructing the redundant data packets based on application of the error correcting code to the set of linear code keys and partitions of the file masked with the set of linear code keys and, based on a minimal cost determined from the iterative determinations, storing the file, linear code keys, and redundant data packets in $N \geq N^*$ of storage nodes, the storage nodes being ordered from largest to smallest by storage capacity such that the largest $Z_e$ storage nodes store the linear code keys, the smallest $N-Z_e-2Z_b$ storage nodes store the partitions of the file, and the redundant packets are stored in the remaining $2Z_b$ storage nodes.

In another approach, file information is stored with sufficient redundancy such that when packets are retrieved from the distributed edge storage nodes, an overprovisioned system of equations for solving for the file information is created. In turn, a unique solution, referred to herein as a Group Kaczmarz approach, is used to identify corrupted blocks from one or more of the edge storage nodes. In turn, the blocks from edge storage nodes may be omitted and an iterative solution to the system of equations may be constructed to reproduce the file from the information retrieved from the distributed edge storage. Specifically, the approach includes selecting N storage nodes that are coupled via a network to store a file of size $|F|$ and redundancy data of size $|F_{red}|$. While the approach may be used with homogeneous storage nodes, in one example at least two of the N storage nodes allocate different sizes of memory for storing the file, the N storage nodes being ordered from a largest storage capacity $|s_1|$ at the first storage node to a smallest capacity $|s_N|$ at the $N^{th}$ storage node. The number of storage nodes N may be based on an average error calculation for a number of t random nodes selected from N for a maximum number of $Z_b$ corrupted nodes. The approach also includes selecting a value $Z_e<N$, wherein an attacker having access to $Z_e$ storage nodes is unable to decode the file. The approach includes dividing the file into file partitions, generating keys that are stored in the first $Z_e$ of the N storage nodes, and creating storage blocks comprising independent linear combinations of the keys and the file partitions. In turn, the method includes storing the storage packets comprising independent linear combinations of the keys and the file partitions in the $Z_e+1$ to $N^{th}$ storage nodes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 7 is an example algorithm for a Group Kaczmarz approach to identification of corrupted data from an edge storage node.

FIG. 10 is an example algorithm for retrieving data from a distributed edge storage system that identifies corrupted nodes to provide resiliency against a Byzantine adversary.

DETAILED DESCRIPTIONS

In the applications incorporated by reference above, approaches for storing data in heterogeneous edge nodes are provided. These approaches allow a file F to be distributedly stored in a plurality of storage edge nodes such that the system is resilient to an eavesdropping attacker having access to a given number of storage nodes ($Z_e$) (i.e., no information about the file F can be obtained by the eavesdropping adversary). The present disclosure presents a modified approach to those discussed in these prior applications to provide further protection against a Byzantine attacker ($Z_b$). A Byzantine attack is based on the Byzantine fault problem in which one or more nodes providing data may be corrupted. In turn, the corrupt data may, without countermeasure, cause the system to fail. In the context of a distributed edge storage system, this may mean that a file F that is distributedly stored amongst a plurality of edge nodes may not be reproduced by an authorized user in view of the data from the edge nodes corrupted by the Byzantine adversary.

In general, the prior approaches to secure distributed storage amongst the heterogenous nodes for resiliency against an eavesdropping adversary is modified such that additional, redundant data is also stored amongst the distributed edge nodes in addition to key packets and masked file packets of the prior approaches. While the additional redundant data provides additional computational complexity to the system, the benefit is that a system may be designed and deployed that provides robust, secure edge node storage for a file that may be impervious to a Byzantine attacker ($Z_b$) and provide the resilience to an eavesdropper ($Z_e$) provided by the prior systems.

One approach to storage of a file F in distributed edge storage relates to a scenario in which an authorized user has access to all of the edge storage nodes in a given system. The present disclosure generally differs from the prior approach of the incorporated applications by modification of the storage selection process to optimize selected storage in view of the need to store the additional data for purposes of conducting error correction on retrieved packets from the edge storage nodes. Moreover, the manner in which a file is partitioned for distributed storage is modified to allow for partitioning and storage of the additional, redundant data. As such, the following discussion generally describes the approach for secure, distributed storage of a file F amongst a plurality of edge storage nodes including storage selection and file partitioning as modified to provide resilience to $Z_b$ corrupted nodes. Also, the present disclosure includes discussion of construction of linear coded keys and packet generation.

Figure 1:
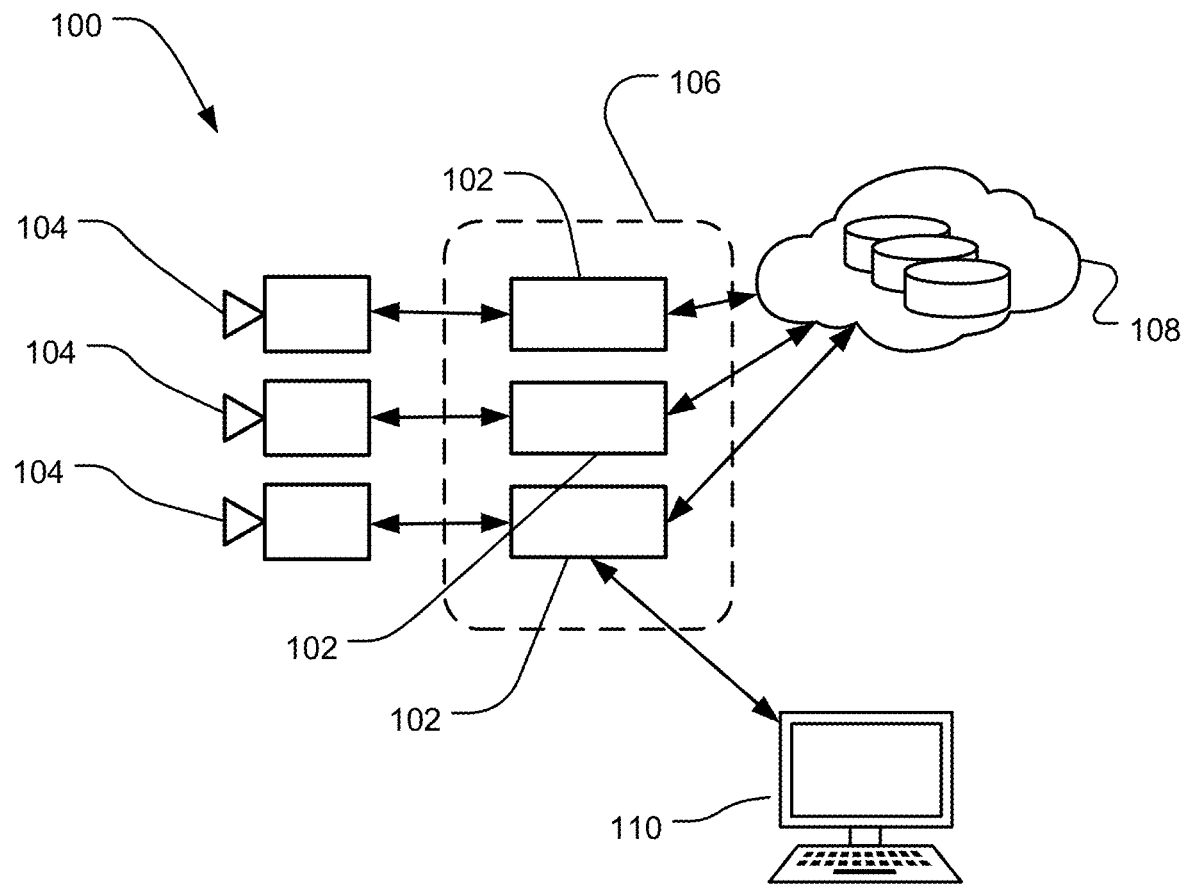
FIG. 1 is a block diagram of an edge storage system according to an example embodiment.

In FIG. 1, a block diagram shows an example edge storage system 100. A plurality of storage nodes 102 store data from sensors 104 (e.g., cameras) or some other data generator. Collectively, at least the storage nodes 102 form an edge layer 106 that are physically close to the sensors 104 and may also send some or all of the data to cloud storage 108. Note that the sensors 104 may also be considered part of the edge layer 106, and in some cases some or all of the sensors 104 may be integrated together with the storage nodes 102, e.g., within the same device.

Distributed edge storage may provide data availability closer to where it is needed and reduces delay. For example, a user terminal 110 in proximity to the edge layer 106 may actively monitor the sensors 104 and/or storage nodes 102 looking for patterns and/or events that occur in near real-time. However, storing data on edge devices can risk data security. For example, the edges devices may have limited capabilities (e.g., computation, memory) and therefore may not be able to implement multiple layers of security without unduly limiting performance. The edge devices may also not be under the control of a single entity, which can make enforcing security policies difficult. This disclosure describes a security scheme that addresses security challenges that are specific to edge devices, but that may be applicable to other devices, e.g., centralized distributed storage systems.

For distributed edge storage setup, one appropriate attack model is the case where a number of edge devices are compromised. More specifically, one potential attack modality is an eavesdropping attack in which the attacker (eavesdropper) controls a group of edge devices and spies on the data stored in them. In another attack modality, an attacker (a Byzantine attacker) may compromise one or more edge devices such that data retrieved from such a compromised device may be corrupted. This second attack modality is sometimes referred to as a Byzantine attack based on the Byzantine fault of distributed computing system in which corrupted data from an attacker causes system failure. Therefore, the present disclosure presents a system in which the goal is to keep data confidential from the devices under attack and to address corrupted data from devices used as distributed storage nodes.

Figure 2:
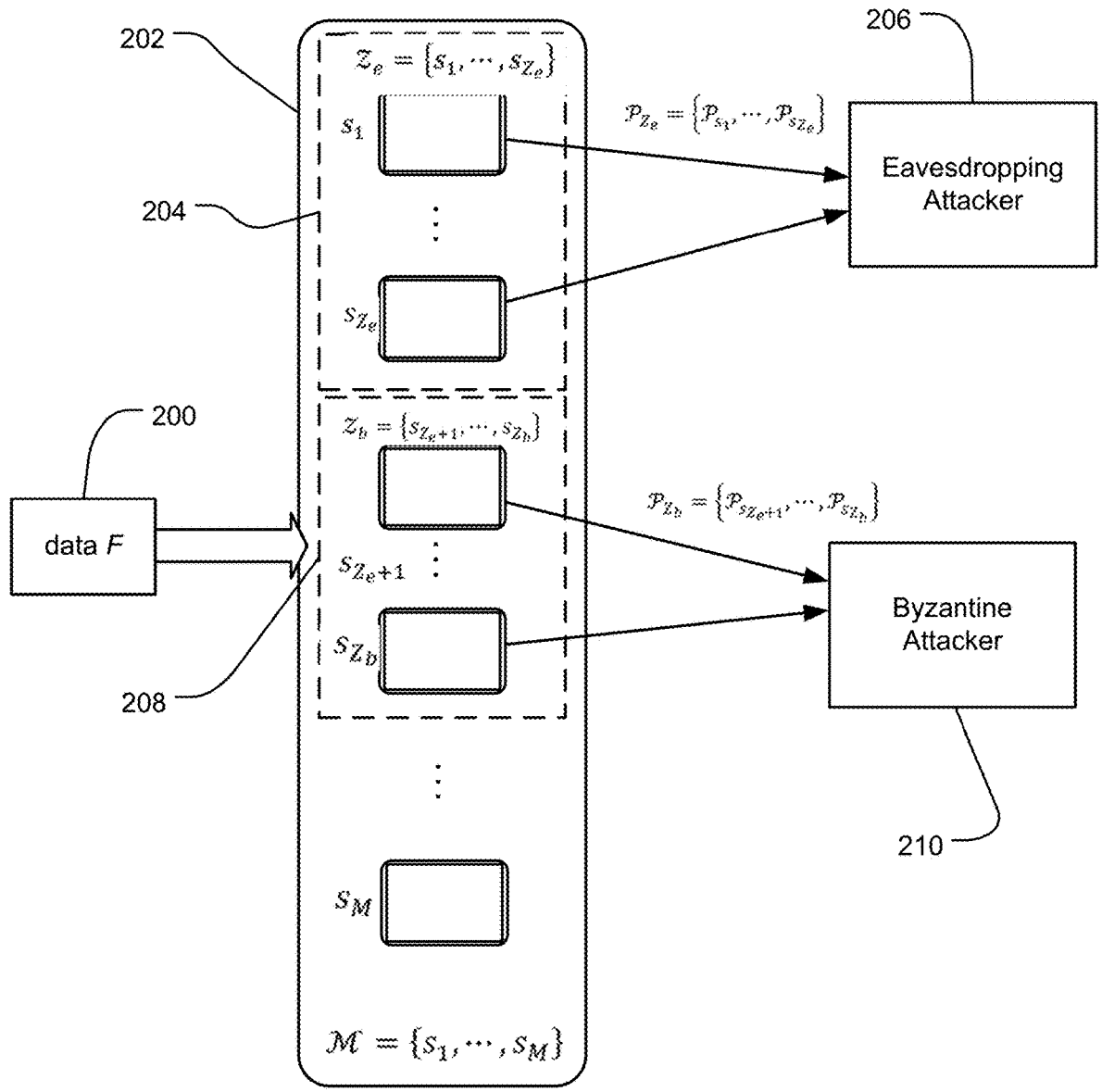
FIG. 2 is a block diagram showing an eavesdropping adversary and a Byzantine adversary according to an example embodiment.

A scenario in which an eavesdropping attacker 206 and a Byzantine attacker 210 are actively attacking edge devices 202 according to an example embodiment is also shown in the block diagram of FIG. 2. Data 200 (e.g., a file F) is stored in a distributed manner among a group of edge storage nodes 202, which may be accessible via a network. An end user may desire to store the file F via a network connected computer device, such as user terminal 110 independently shown in FIG. 1, For purposes of this disclosure, a storage node is an independently operable, self-contained computing unit that includes at least some available storage. This independence means that an eavesdropping attacker 206 or a Byzantine attacker 210 that has access to one storage node does not of necessarily have access to other nodes that interoperate to store parts of the data 200. This is different than other distributed storage schemes such as a disk array where data file portions may be distributed among different disks. Generally, an attacker that can access one disk in array (e.g., by having access to the host computer or a storage controller card) of can usually access all of the disks. Also note that the edge storage nodes 202 do not necessarily need to communicate with each other to achieve the distributed storage described herein, but all will generally be accessible by a single entity, e.g., an authorized user terminal.

In this example, a first subset 204 of the edge storage nodes 202 can be accessed by an eavesdropping attacker 206 such that the eavesdropping attacker 206 can view the data of interest stored on the first subset 204. For purposes of this disclosure, the value $Z_e$ signifies the maximum number of nodes to which the eavesdropping attacker 206 has access for which the system has protection. In addition, a second subset 208 of the edge storage nodes 202 can be accessed by a Byzantine attacker 210 such that the Byzantine attacker 210 can corrupt data of interest stored on the second subset 208. For the purposes of this disclosure, the value $Z_b$ signifies the maximum number of nodes of which the Byzantine attacker 210 may corrupt the data while maintaining system operability. The system is designed such that the eavesdropping attacker 206 cannot read any partial information of the data file 200 with access to only $Z_e$ nodes. Moreover, the system is designed such that a Byzantine attacker 210 cannot prevent an authorized user from retrieving sufficient information of the data file 200 only $Z_b$ nodes are corruptible by the Byzantine attacker 210. An authorized user will have access to more than $Z_e$ of the nodes 202 and therefore can read the data file 200. Moreover, the authorized user will be capable of correcting errors in information received from $Z_b$ of the nodes 202. In this example, the authorized user will need access to all of the edge nodes 202 to read the data file 200. Furthermore, it may be appreciated that the authorized user may not be capable of distinguishing a node that has been compromised by an eavesdropping attacker 206 or a Byzantine attacker 210. Further still, it may be that the $Z_e$ nodes and $Z_b$ nodes may share at least one node that is compromised by both the eavesdropping attacker 206 and the Byzantine attacker 210.

Secret sharing schemes using linear coded keys address eavesdropping attacks, where data is divided into shares with equal sizes and each share is masked with linear coded keys and stored in one of the available storage nodes. For instance, assume there are $\mathcal{M}=4$ available storage nodes of $\mathcal{M}=\{s_1, s_2, s_3, s_4\}$. Data F is first divided into two equal shares of $f_1$ and $f_2$ and keys $k_1$ and $k_2$ are generated. Then, the four packets of $\mathcal{P}_{s\,s_1}=k_1$, $\mathcal{P}_{s\,s_2}=k_2$, $\mathcal{P}_{s\,s_3}=f_1+k_1+k_2$, $\mathcal{P}_{s\,s_4}=f_2+k_1+2k_2$ are created and stored in the four storage nodes of $\mathcal{M}=\{s_1, s_2, s_3, s_4\}$. Note that the values of the packets are arithmetically combined as indicated and truncated to fit in the packets. This system setup keeps both shares $f_1$ and $f_2$ confidential from any $Z_e=2$ storage nodes that might be under an eavesdropping attack.

To provide resilience to a Byzantine attacker, additional information regarding the file F is stored redundantly. The additional information may be used in an approach to error correction (e.g., an (n, k)) error correction code). In turn, when data is retrieved from the storage nodes, an error correction code may be applied to the retrieved data such that any corrupted data received from a storage node compromised by a Byzantine attacker may be corrected. Specifically, for a given (n, k) error correcting code capable of correcting e errors, additional, redundant data in the amount of n–k per k pieces of information may be stored in the distributed storage nodes.

Figure 3:
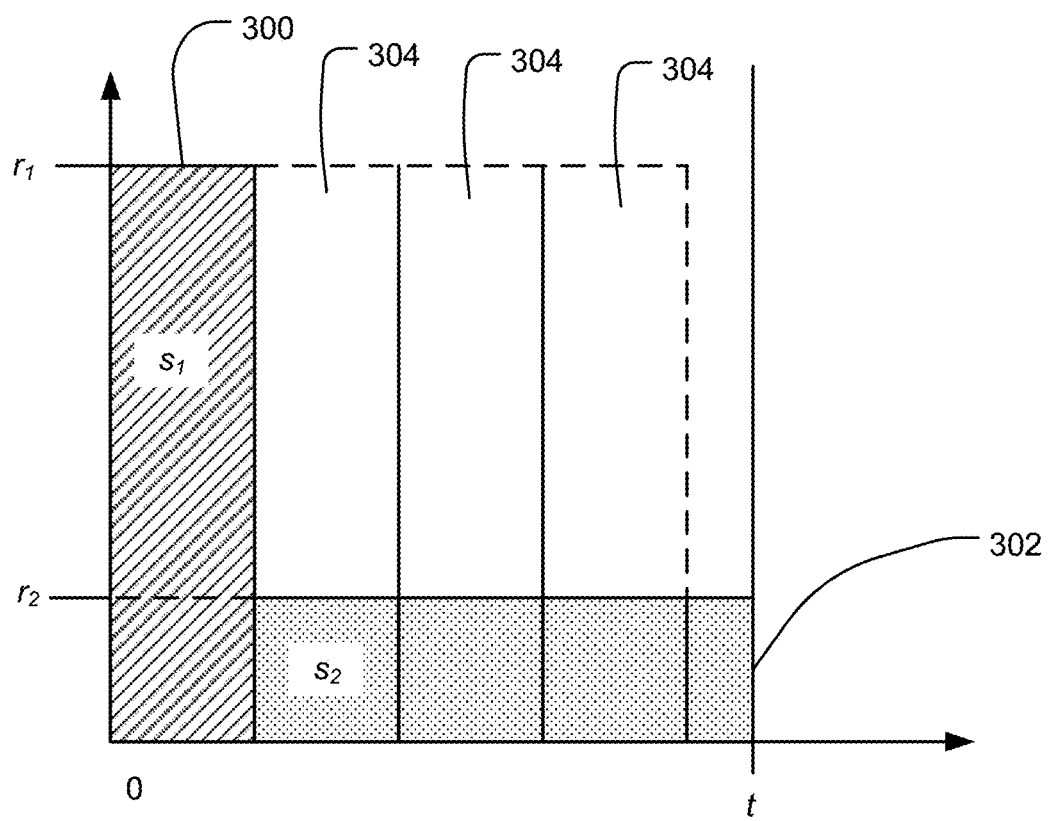
FIG. 3 is a block diagram showing node storage availability according to an example embodiment.

The edge device storage nodes 202 may be heterogeneous with different memory, compute, bandwidth, power, etc. Direct application of the existing secret sharing schemes yields poor performance for distributed edge storage as they do not take into account the heterogeneity of storage nodes. For example, if the four storage nodes $\mathcal{M}=\{s_1, s_2, s_3, s_4\}$ have different allocated storage availability, then the stored packets of $P_{s_1}$, $P_{s_2}$, $P_{s_3}$, and $P_{s_4}$ should have different sizes. For purposes of this disclosure, the term "storage availability" is used to describe the capability of a storage node to fulfill a request that meets some minimum requirement. The storage node should not only have the available capacity to store the data but should have performance when writing to and reading from the storage (which includes network communications) that satisfies a minimum standard defined for the system. In FIG. 3, a diagram shows how storage availability may be different for different storage nodes according to an example embodiment.

In FIG. 3, rectangles 300 and 302 represent data transfer over time for two different heterogeneous storage nodes $s_1$ and $s_2$. Node $s_1$ has a higher transfer rate $r_1$ than node $s_2$ which transfers data at rate $r_2$. A partition of size |f| is available if the data storage node can transmit and receive the partition within time t. The area of blocks 300 and 302 are both of size |f|, thus both of these nodes have storage availability of at least one partition. As indicated by blocks 304, the node $s_1$ can theoretically have storage availability of four partitions of size |f|, assuming the node $s_1$ also has enough storage if capacity available. In this example, even if node $s_2$ had a much higher storage capacity than node $s_2$ it would still have one fourth the storage availability.

In order for an entity to utilize heterogeneous edge storage nodes for secure storage, the entity may define, among other things, (i) how to select storage nodes among all candidates, (ii) how to partition file, (iii) how to generate the keys, and (iv) how to create packets to be stored in the selected storage nodes. These issues are addressed in this disclosure, as well as how the storage allocation can be optimized for cost.

Figure 4:
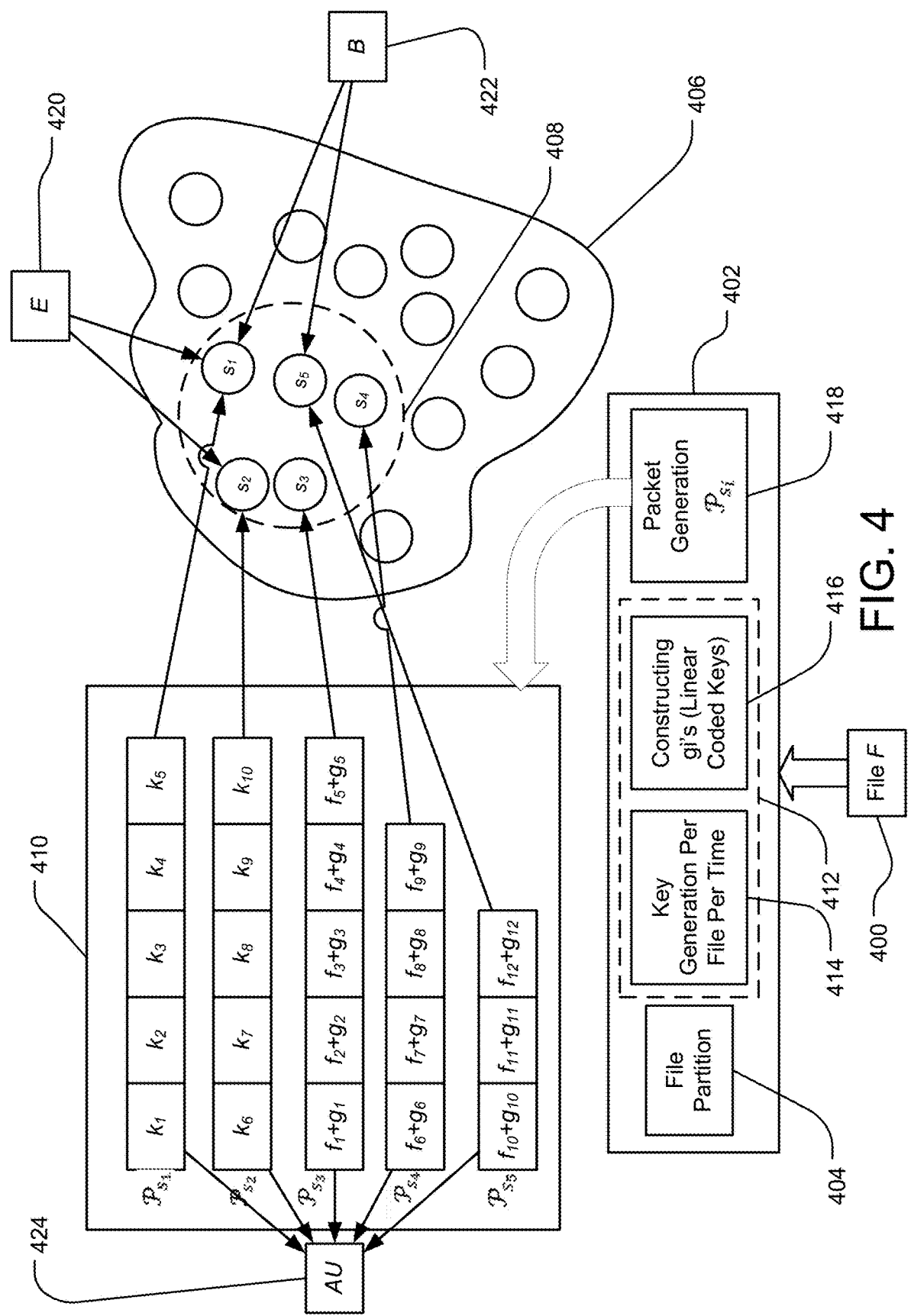
FIG. 4 is a block diagram showing a secure distributed edge storage scheme that provides resiliency to one or more eavesdropping adversary and one or more Byzantine adversary.

In FIG. 4, a block diagram shows a distributed edge storage scheme according to an example embodiment. A file 400 is processed by a storage processing apparatus 402, which may include conventional computing hardware such as processors, memory, input/output busses, etc., as well as specialized hardware, e.g., application-specific integrated circuits, digital signal processors etc. The storage processing unit includes functional units (e.g., software modules, logic circuits) such as a file partitioner 404 that may be configured to query an edge network 406 of edge storage nodes to determine storage availability of the individual storage nodes. Using techniques that will be discussed below, the file partitioner 404 selects a subset 408 of the nodes and creates a definition 410 of the storage configuration for the file 400. This definition 410 includes identification of the selected storage nodes, the partition/packet size on each node, the arranged of data and keys in each partition, etc.

A key generation section 412 includes a module 414 that generates a key set for the file 400 and a module 416 that linearly combines the keys of the set into linear coded keys, $g_i$'s. A packet generation module 418 uses the definition 410 and the linear coded keys to generate and store the file 400 on the network 406. A similar set of modules may be used to read data from the network 406, based on the definition 410, download the partitions/packets, unencrypt the partitions/packets, and reassemble the file.

Each packet is created using the file partitions and the generated keys. The file partitioner 404 uses the available heterogeneous resources efficiently such that the designed distributed edge storage system is secure against an eavesdropper adversary 420 attacking at most $Z_e$ storage nodes and a Byzantine adversary 422 attacking at most $Z_b$ storage nodes. Consider a system model where there are $\mathcal{M}$ heterogeneous edge devices that can be used as distributed storage nodes. The set of all candidate storage nodes in network 406 is denoted by $\mathcal{M} = \{s_1, s_2, \ldots, s_\mathcal{M}\}$. A subset 408 of all $\mathcal{M}$ available storage nodes are selected to be used for securely storing data F.

The set of selected storage nodes is denoted by $\mathcal{N} = \{s_1, s_2, \ldots, s_N\}$ where $\mathcal{N} \leq \mathcal{M}$. Then, the set of packets $\mathcal{P}_\mathcal{N} = \{\mathcal{P}_{s_{s_i}}, i \in \mathcal{N}\}$ are created to be stored in the set 408 of the selected storage nodes, where $\mathcal{P}_{s_{s_i}}$ is stored at storage $s_i \in \mathcal{N}$.

It is assumed that the system is vulnerable to an attack, where the capability of an eavesdropping attacker 420 is characterized in terms of parameter $Z_e < \mathcal{N}$. More specifically, the eavesdropping attacker 420 can have access to the data stored in at most $Z_e$ storage nodes. However, the information on which storage nodes are under attack, is not known at the defender side, therefore, the goal is to make the data F confidential from any $Z_e$ storage nodes. The value of $Z_e$ can also be considered as a security parameter where higher values of $Z_e$ provides more security to the system and smaller values of $Z_e$ makes the system more vulnerable to an attack.

It is also assumed that the system is vulnerable to an attack, where the capability of a Byzantine attacker 422 is characterized in terms of a parameter $Z_b < \mathcal{N}$. More specifically, the Byzantine attacker 422 can corrupt the data stored in at most $Z_b$ storage nodes. Like the eavesdropping attacker 420, the information on which storage nodes are under attack by the Byzantine attacker 422 is also not known at the defender. As such, the goal is to make the data F capable of being corrected of errors when any $Z_b$ storage nodes provide corrupted data to the authorized user 424. The value of $Z_b$ can also be considered as a security parameter where higher values of $Z_b$ provides more security to the system and smaller values of $Z_b$ makes the system more vulnerable to an attack.

From the defender point of view, a more robust system with larger values of $Z_e$ and $Z_b$ comes with the cost of an increase in the storage usage (increase in the number of distributed storage nodes) and an increase in the complexity of designing the secure system. In other words, parameters $Z_e$ and $Z_b$ can be considered as a tradeoff between providing more security and the increase in the complexity of system by taking into account the vulnerability state of the system to an attack.

One goal is to store the data such that the attacker cannot get any meaningful information about data. More specifically, the proposed solution provides information theoretic secrecy defined as $H(F|\mathcal{P}_\mathcal{Z}) = H(F)$, where $H(\ )$ is the information theory entropy and $\mathcal{P}_\mathcal{Z}$ is the data stored in any storage set $\mathcal{Z} \subset \mathcal{N}$ with size Z, ($|\mathcal{Z}|=Z$). One of the applications of information theoretic secrecy is where a linear combination of the data partitions can reveal some meaningful information about the whole data set. In the proposed method, any linear combination of the data partitions is kept confidential from any subset of storage nodes of quantity $Z_e$. An authorized user can extract the data F by having access to all of the packets stored in the storage set $\mathcal{N}$.

In this disclosure, features are described that assist in reducing computational complexity at the design stage as well as reducing computational complexity and communication cost for an authorized user at the stage of retrieving data. In reference again to FIG. 4, the subset of all candidate storage nodes is selected to distributedly store file F. The selected storage set should satisfy the minimum requirements to provide security. In the second step, the file F is divided into partitions. In the third step, keys are generated and $g_i$'s are constructed as the linear combinations of the generated keys, where $g_i$ values are used to mask the file partitions. In the fourth step, the file partitions and the constructed $g_i$'s are used to generate packets and store them in the set of selected storage nodes. The details of each step along with a complementary example are described below.

Storage Selection

All keys and file partitions need to be retrieved to recover the file in this approach. Therefore, the set of storages was selected such that the sum storage size over all storage nodes is equal to the sum of |F| (the size of file F) and |K| (the size of keys required to keep data confidential from $Z_e$ storages). That is, the size of the keys can be described as $|K|=Z_e|\mathcal{P}_{s_{Z_e+1}}|$ or as the number of nodes that an eavesdropping attacker has access to times the size of the packet for the first node beyond the number of nodes that an eavesdropping attacker has access. Thus, for purposes of an error correcting code, the size of the message length k=|K|+|F|, which is the data required to retrieve and recover the file.

The present disclosure further considers the possibility that data is corrupted from $Z_b$ nodes, with $Z_b$ again being a design parameter of the system. The approach described herein makes the system robust against Byzantine attacks, by use of an error correcting code to the retrieved file packets. For example, an error correcting code may be used that is an (n, k) error correcting code, with k=|K|+|F| as described above. That is, for a given message length of k a block length of n may be provided for purposes of correcting errors in the received block. The message length and the block length include additional information in the form of bits for use in correction of errors. The message length may be a function of the size of the keys K and the file F. As such, the total size of data stored in the storage nodes may be increased by n−k, which represents the additional information needed for purposes of correcting errors.

The (n, k) error correcting code may be capable of correcting $e=Z_b|\mathcal{P}_{s,max}|$ errors, where $|\mathcal{P}_{s,max}|$ is the largest size of packets stored among all storages. The reason is that the maximum number of corrupted storages is $Z_b$ and thus the maximum size of corrupted information is the multiple of the maximum packet size among all storages multiplied by the number of nodes corrupted by a Byzantine attacker. As way of example, a Reed-Solomon Code may be used as the (n, k) error correcting code. In this example, n−k is equal to 2e, which may be used in a cost function as described below to determine the number of storages required to store a file of size |F|. Other error correcting codes may have different capability for correction of errors, which would be understood based on the present disclosure to modify the cost function appropriately.

In order to provide security, the file partitions (including redundant data for error correction) are masked with keys and thus some of the available memory resources should be allocated to store keys. The minimum requirement to satisfy the information theoretic privacy for storing a file partition f in a storage node is to mask it with a random key that has the same size as f, e.g., f+k, where $|k|=|f|$. In addition, to keep data confidential from any $Z_e$ storage nodes, the packets stored in any $Z_e$ storage nodes should be linearly independent. For this constraint to be satisfied, one requirement is that for any stored packet $\mathcal{P}_{s\,s_i}$ (stored in storage $s_i$) with size $|\mathcal{P}_{s\,s_i}|$, there should be at least $Z_e$ other stored packets (each stored in another storage) with size greater than or equal to $|\mathcal{P}_{s_i}|$. In other words, if the storage nodes are ordered in the order of descending allocated storage sizes such that $|s_1| \geq |s_2| \geq |s_2| \geq \ldots |s_N|$, one minimum requirement is that the packets stored in the first $Z_e+1$ storage nodes have the same size. In addition, any $Z_e$ storage nodes should contain linearly independent packets.

Therefore, the first requirement for the storage selection is $\Sigma_{i=Z_e+1}^{N}|s_i|=|F|$, where $|F|$ is the size of file F. The other requirement is that the total allocated storage size over all storage nodes should be equal to $\Sigma_{i=1}^{N}|s_i|=\Sigma_{i=1}^{Z_e}|s_{Z_e+1}|+\Sigma_{i=Z_e+1}^{N}|s_i|=Z_e|s_{Z_e+1}|+|F|$. This means that for allocating data F, distributedly, $Z_e|s_{Z_e+1}|$ extra memory is required that is used to store keys and keep data secure. However, for an authorized user to be able to retrieve data F, it should have access to the data stored in all storage nodes and download them, then it should subtract the key parts and extract the useful information F.

Furthermore, as discussed above, the use of an error correcting code requires storage of additional information that is used to perform the error correcting. Specifically, the next $2Z_b$ largest storages after the largest $Z_e$ storages are used to store the additional information provided for error correction, or $n-k=2Z_b|\mathcal{P}_{s,max}|$. Lastly, the remaining $N-Z_e-2Z_b$ smallest storages are used to store file partitions masked with keys. Thus $|\mathcal{P}_{s,max}|$, the largest portion of file F masked with keys, corresponds to the file packet that is stored in storage $s_{Z_e+2Z_b+1}$. Note that all the packets stored in the largest $Z_e+2Z_b+1$ storages may have the same size.

The cost for the authorized user to retrieve data from $\mathcal{Z}$ storage nodes is a function of number of storage nodes as well as other parameters such as type of storage, bandwidth, power, etc., which are different for different storage nodes. The set of selected storage nodes should be chosen to minimize the cost. Even if the storage nodes are homogeneous in terms of type of storage, bandwidth, and power, but heterogeneous only in terms of available storage size, minimizing cost is still not trivial. In the following, an optimized set of selected storage nodes is found by focusing on optimizing the cost for this simplified scenario using Equation (1) below, which factors the cost for keeping data safe from $Z_e$ nodes subject to an eavesdropping attack and provides for sufficient information to correct errors in $Z_b$ nodes corrupted by a Byzantine attacker:

$$\text{cost}=NC_T+(Z_e|\mathcal{P}_{s,max}|+|F|+n-k)C_d=NC_T+(Z_e|\mathcal{P}_{s,max}|+|F|+2Z_b|\mathcal{P}_{s,max}|)C_d \quad \text{Equation 1}$$

As seen in Equation (1), cost includes two parts: (i) $NC_T$, where $C_T$ is the initial cost for accessing the data stored at each storage node and $NC_T$ is the total cost over all storage nodes, and (ii) $(Z_e|\mathcal{P}_{s,max}|+|F|+n-k)C_d$, where $C_d$ is the transmission and downloading cost for one piece of information and the total cost for all data is $(Z_e|\mathcal{N}_{s,max}|+|F|+n-k)C_d$. Generally, $C_T$ includes actions such as network discovery, setting up and releasing connections, etc. Note that in the simplified model, $C_T$ and $C_d$ may be considered constant for each candidate storage node. In some variations, $C_T$ and $C_d$ may be different for each node, such that the cost values in Equation (1) are averages, more specifically, for $C_d$ it is weighted average $C_d=(\Sigma_{i=1}^{N}|\mathcal{P}_{s_i}|C_{d,i})/\Sigma_{i=1}^{N}|\mathcal{P}_{s_i}|$ and for $C_T$ it is the average $C_T=(\Sigma_{i=1}^{N}C_{T,i})/N$, where $|\mathcal{P}_{s_i}|C_{d,i}$ and $C_{T,i}$ are the downloading cost values of the $i^{th}$ storage node and the initial cost for accessing the data stored at storage node i, respectively.

The goal is to select the set of storage nodes $\mathcal{N}$ such that the cost defined in Equation (1) is minimized. To tackle this problem, the effect of $|\mathcal{P}_{s,max}|$ on cost in Equation (1) is determined, and then a lower bound on cost is found and the corresponding optimized value of N. $|\mathcal{P}_{s,max}|$ is equal to the largest portion of file F that is masked with keys and stored at storage $s_{Z_e+2Z_b+1}$ among all packets stored at all storage nodes. In order to reduce cost, $|\mathcal{P}_{s,max}|$ should be selected as small as possible. On the other hand, as will be explained later in "File Partition" section, the file partitions are distributed among the last $N-Z_e-2Z_b$ storage nodes, therefore, the minimum size for the largest portion is equal to $|F|/(N-Z_e-2Z_b)$, which is the case when the file partitions are equally distributed among the last $N-Z_e-2Z_b$ storage nodes. Again, this differs to an approach with eavesdropping security alone as the additional information used for error correction is to be stored in the $2Z_b$ storage nodes.

The optimal cost solution may not always be possible as the storage nodes containing different portion of file partitions are heterogeneous with different $|s_i|$ and thus different $|P_{s_i}|$. However, this can provide a lower bound on cost, as shown in Equation (2) below.

$$\text{cost} \geq NC_T + \left(\frac{(Z_e+2Z_b)|F|}{N-Z_e-2Z_b} + |F|\right)C_d \quad \text{Equation 2}$$

As seen in Equation (2), by increasing N, the first part of the lower bound increases and the second part decreases. Therefore, there is an optimum value for N that minimizes the lower bound, which can be calculated as shown in Equation (3) below, where N* is rounded to the optimized integer. Specifically, $N_1$ is N* rounded to the nearest smaller integer and $N_2$ is N* rounded to the nearest larger integer.

$$N^* = \begin{cases} N_1 = \left\lfloor\sqrt{\frac{(Z_e+2Z_b)|F|C_d}{C_T}} + (Z_e+2Z_b)\right\rfloor, & N_1C_T + \left(\frac{(Z_e+2Z_b)|F|}{N_2-(Z_e+2Z_b)} + |F|\right)C_d < N_2C_T + \left(\frac{(Z_e+2Z_b)|F|}{N_2-(Z_e+2Z_b)} + |F|\right)C_d \\ N_2 = \left\lceil\sqrt{\frac{(Z_e+2Z_b)|F|C_d}{C_T}} + (Z_e+2Z_b)\right\rceil, & \text{Otherwise} \end{cases} \quad \text{Equation 3}$$

Figure 5:
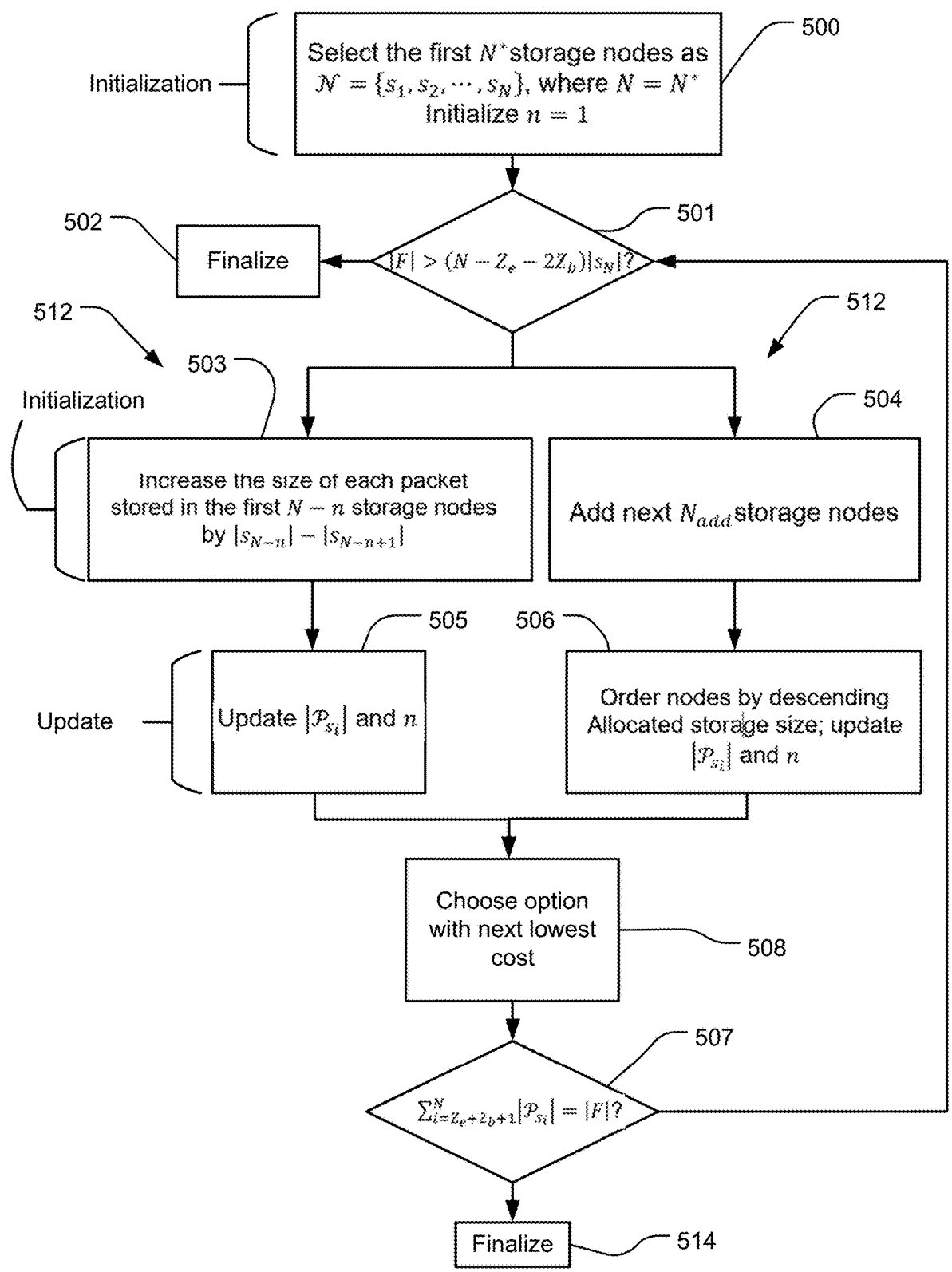
FIG. 5 is a flow chart showing an example of node selection.

The cost with the optimized calculated number of storage nodes N* is larger than the calculated lower bound in Equation (2), when the edge devices are heterogeneous. However, this clue can be used to select the set $\mathcal{N}$ for heterogeneous distributed edge storage. The strategy is to initially use equal memory sizes from the first N* storage nodes (the storage nodes with the largest available storage sizes) and if more memory is required for storing F, then iteratively decide to either (i) add more storage nodes or (ii) use more memory from each available storage. The decision between these two options is made based on minimizing the cost. The details are provided below and generally illustrated in FIG. 5, which is a flowchart showing selection of nodes according to an example embodiment. Note that $|s_i|$ represents the maximum available memory size at storage $s_i$ and $|\mathcal{P}_{s_i}|$ represents the memory size used from storage $s_i$ to store a portion of file F, packet $\mathcal{P}_{s_i}$.

An initialization 500 of the storage selection involves selecting the first N* storage nodes as $\mathcal{N} = \{s_1, s_2, \ldots, s_{N^*}\}$ after ordering the nodes in the descending available storage sizes. The maximum size of file F that can be equally and distributedly stored in these storage nodes is $(N-Z_e-2Z_b)|s_{N^*}|$. Therefore, if it is determined 501 the size of file F is larger than this, then the "Modification" stage is entered, where either 510 more of storage nodes are added or 512 more memory from the available storage nodes $\mathcal{N}-N$ is used. If the size of the file F is less than what is available in the first N* storage nodes, the set of initially selected storage nodes is finalized 502 as $\mathcal{N} = \{s_1, s_2, \ldots, s_{N^*}\}$ and where the size of each packet stored in each storage $s_i$ is equal to $|\mathcal{P}_{s_i}| = |s_{N^*}|$, $1 \leq i \leq N^*$.

The Modification stage involves determining one of these options 510, 512 where the one with the minimum cost is selected. For the Modification stage, info=$(N-Z_e-2Z_b-n)(|s_{N-n}|-|s_{N-n+1}|)$ more information can be added to the distributed storage system by (i) increasing 503 the size of each packet stored in the first N−n storage nodes by $|s_{N-n}|-|s_{N-n+1}|$, with the update $|\mathcal{P}_{s_i}|=|\mathcal{P}_{s_i}|+|s_{N-1}|-|s_{N-n+1}|$, $1 \leq i \leq N-n$, or (ii) adding 504 the next $N_{add}$ storage nodes, such that $\Sigma_{i=N+1}^{N+N_{add}}|s_i| \geq \text{info}$. Note that n was initialized to 1 at step 500, and $N_{add}$ should be as small as possible to reduce the increase in the cost. Each option 503, 504 adds a different cost. More specifically, the first option increases the cost by $\text{cost}_{add,1}=(Z_e+2Z_b)(|s_{N-n}|-|s_{N-n+1}|)C_d$, as the size of $|\mathcal{P}_{s_{Z+1}}|$ is increased by $|s_{N-n}|-|s_{N-n+1}|$ in Equation (1) and the second option 504 increases the cost by $\text{cost}_{add,2}=N_{add}C_T$, as the number of storage nodes is increased by $N_{add}$ in Equation (1). Depending on the system parameters, the option with the lower cost is selected (see operation 508).

Note that if info=$(N-Z_e-2Z_b-n)(|s_{N-n}|-|s_{N-n+1}|)$ is equal to 0, the first option 503 is not available and thus the second option 504 is selected by adding as many additional storage nodes as required such that info=$|F|-\Sigma_{i=Z_e+2Z_b+1}^{N}|\mathcal{P}_{s_i}|$ and $\Sigma_{i=N+1}^{N+N_{add}}|s_i| \geq \text{info}$. After this selection, the variables are updated as shown in operation as detailed in FIG. 5.

After the Modification stage, which involves modifying the size of memory used from each storage or the set of selected storage nodes, then parameters should be updated. If first option 503 is selected in the Modification stage, update 505 involves updating the parameters $|\mathcal{P}_{s_i}| \forall 1 \leq i \leq N-1$ and parameter n as n=n+1. If the second option 504 is selected in the Modification stage, the set of selected storage nodes should be updated 506 by ordering by descending allocated storage size and adding the $N_{add}$ storage nodes to the set of selected storage nodes $\mathcal{N} = \mathcal{N} + \{s_i\}_{i=N+1}^{N+N_{add}}$, $N=N+N_{add}$. In addition, $|\mathcal{P}_{s_i}|$, $\forall N-N_{add}+1 \leq i \leq N-1$ should be set as $|\mathcal{P}_{s_i}|=|s_i|$. Note that depending on the amount of info, $|\mathcal{P}_{s_N}|$ might be selected such that not all available size of storage $s_N$ is used, i.e., $|\mathcal{P}_{s_N}| \leq S_N$. Furthermore, the parameter n should be updated as n=n+$N_{add}$.

After making the required updates, if the condition 507 $\Sigma_{i=Z_e+2Z_b+1}^{N}|\mathcal{P}_{s_i}|=|F|$ is not still met for the lowest-cost option, the stages "Modification" and "Update" can be sequentially repeated until the condition is met. When the condition 507 is satisfied, the storage configuration is finalized 514 similar to the finalization 502 but using the nodes and packet sizes determined in the "Modification" and "Update" stages.

File Partitioning

The first $Z_e$ storage nodes are allocated to store the keys only, the next $2Z_b$ storage nodes are allocated to store the $2Z_b|\mathcal{P}_{s,max}|$ redundant pieces of information for error correction of keys and file partitions masked with keys, and the remaining $N-Z_e-2Z_b$ storage nodes store the file partitions masked with keys.

Accordingly, the packets stored in the largest $Z_e$ storages and the smallest $N-Z_e-2Z_b$ storages are allocated as described in the File Partitioning section of U.S. patent application Ser. No. 16/669,696 incorporated by reference above.

The packets stored in the remaining $2Z_b$ storages are the redundant pieces of information required by the error correcting codes to detect and correct the corrupted packets. These packets are constructed using the generator matrix of the error correcting codes multiplied with the vector consisting of keys and the file partitions masked with keys. i.e., all information stored collectively in the first $Z_e$ and the last $N-Z_e-2Z_b$ storages.

In addition, the key generation and constructing $g_i$'s as well as packet generation is also according to the disclosure in U.S. patent application Ser. No. 16/669,696. That is, the key information is stored in the largest $Z_e$ storage nodes and the file partitions masked with keys are stored in the smallest $N-Z_e-2Z_b$ storage nodes with the remaining $2Z_b$ storage nodes storing the packets constructed using the generator matrix of the error correcting codes multiplied with the vector consisting of keys and the file partitions masked with keys.

In this regard, to retrieve a file F, an authorized user retrieves all stored packets from the distributed storage. The file partitions may be unmasked using the keys and any errors in the data may be corrected by application of the error correcting code.

Figure 6:
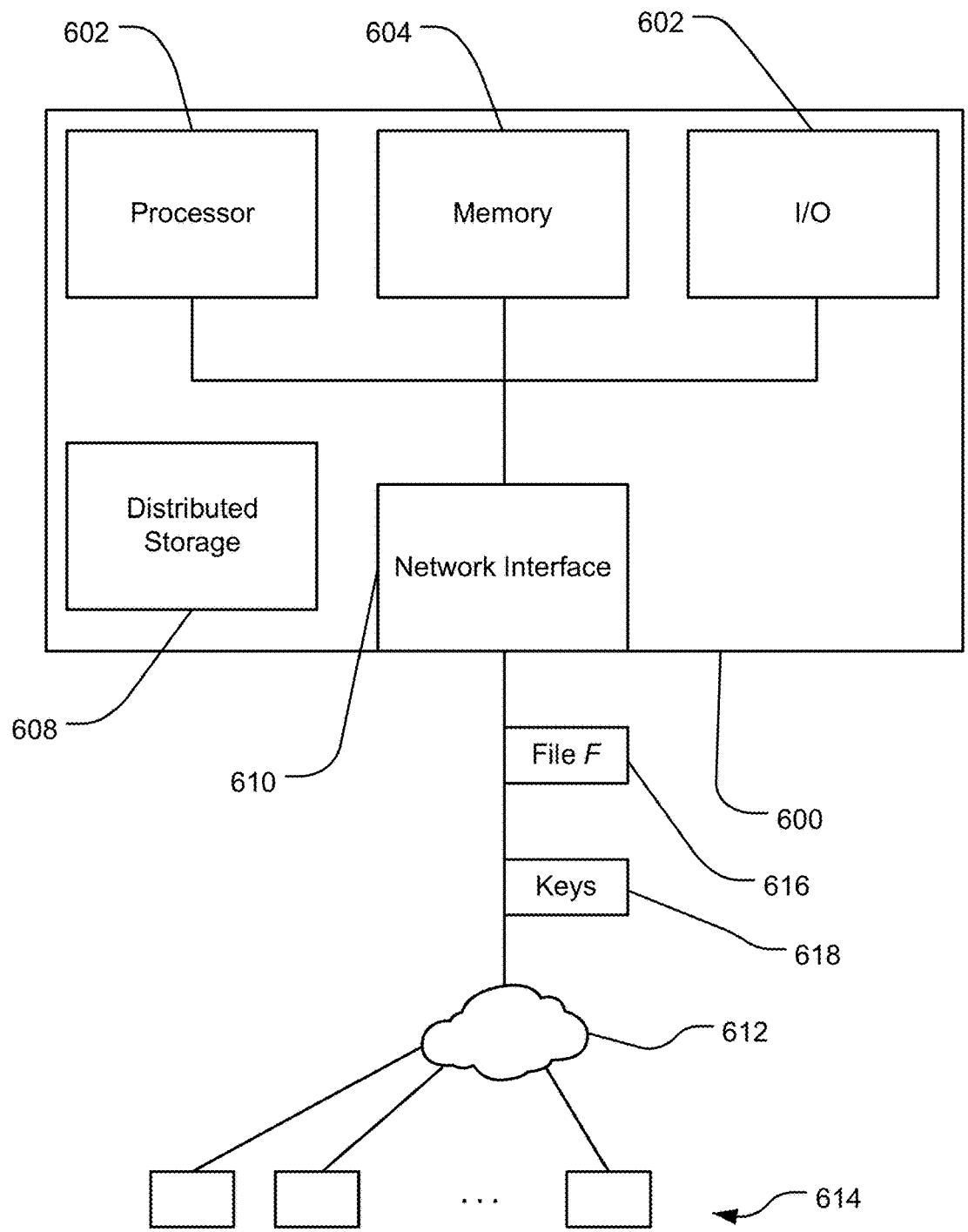
FIG. 6 is a block diagram of an apparatus according to an example embodiment.

In FIG. 6, a block diagram illustrates an apparatus 600 according to an example embodiment. This apparatus 600 may be configured as a user terminal as described above, although storage nodes may also have similar hardware. The apparatus includes a processor 602 (e.g., CPU), memory 604, and input/output circuitry 606. The memory 604 may include both volatile memory (e.g., RAM) and non-volatile instructions memory (e.g., flash memory, magnetic storage) and may store instructions 608, which in this case facilitates distributed storage via a network 612. The apparatus 600 has a network interface 610 that is used for accessing the network 612. The network 612 includes a plurality of storage nodes 614, e.g., edge storage nodes as described above.

The instructions 608 are operable to cause the processor 602 to select a value $Z_e$ (e.g., selected by a system designer via the apparatus) such that an attacker having access to $Z_e$ of the storage nodes 614 is unable to decode a file 616 of size |F| stored in the network 612 that distributedly stores the file in more than the $Z_e$ storage nodes. The instructions 608 are also operable to cause the processor 602 to select a value $Z_b$ (e.g., selected by a system designer via the apparatus) such that an authorized user is able to correct errors from $Z_b$ of the storage nodes 614. The instructions 608 cause the processor 602 to select N* of storage nodes that minimizes a cost function that includes |F|, $Z_e$, $Z_b$, an initial data access cost $C_T$, and a transmission and downloading cost $C_d$. The instructions 608 cause the processor 602 to initially allocate equal memory sizes from largest (with the largest available capacity) N* storage nodes to store the file and a set 618 of linear code keys.

The instructions 608 cause the processor 602 to iteratively determine a first cost of adding more storage nodes to N* storage nodes and a second cost of allocating more memory from each of the N* storage nodes. Based on a minimal cost determined from the iterative determinations, the instructions 608 cause the processor 602 to store the file 616 and linear code keys 618 in N≥N* of the storage nodes, the keys 618 stored in a first through $Z_e^{th}$ storage nodes and partitions of file 616 masked with independent linear combinations of the keys 618 stored in a $Z_e+2Z_b+1^{th}$ to $N^{th}$ storage nodes. Also, redundant data generated by application using the generator matrix of the error correcting codes multiplied with the vector consisting of keys and the file partitions masked with keys is stored in the remaining $2Z_b$ storages.

Another approach to secure storage of data in edge storage nodes provides data redundancy such that data may be retrieved even when an authorized user has access to less than all of the available storage nodes in the system. For example, one such approach is described in U.S. patent application Ser. No. 16/669,712 incorporated by reference above. Such an approach reflects the fact that the storage nodes in the system may vary over time (e.g., due to loss and/or addition of storage nodes to the system). That is, a system may be designed such that the data F can be retrieved by having access to the data stored in t devices, where $Z_e<t≤N$. The reason behind this consideration is that the edge devices are mobile and the encounter time of the authorized user with the storage nodes may vary over time, e.g., the storage nodes may be offline from time to time. In addition, edge devices are not designed for enterprise purposes and thus their tolerance threshold against failure might be low. Therefore, the goal is providing the ability to retrieve data by having access to less than all N storage nodes in case some storage nodes become unavailable due to mobility or failure.

As described in relation to the previous approaches that provide secure distributed file storage with edge node loss, a redundant amount of data $|F_{red}|$ is stored amongst available storage nodes. This provides redundancy and allows for a file F to be reconstructed from retrieved data packets even in the case where there is a change in the identity of the edge nodes storing the packets related to the file F due to, for example, one or more edge nodes storing packets becoming unavailable after the packets are stored.

Generally, when retrieving the packets from the distributed storage nodes, the result is a system of linear equations in the form of Ax=b where each row of A is a vector of coefficients of keys and file partitions corresponding to the related packet block, x is the vector of keys and file partitions, and b is the vector of the values of the packet blocks collected from the storage nodes to which the authorized user has access. In the scenario in which a Byzantine attacker is corrupting data retrieved from the edge storage nodes, an error parameter e is added to the system of equations to create a system of equations described as Ax=b+e. For storage nodes that have not been compromised by a Byzantine attacker, the error parameter e will be zero. However, an authorized user does not have a priori knowledge of what nodes may be attacked.

In turn, the present disclosure presents an approach in which the system of linear equations created by retrieved packets from storage nodes is iteratively solved using what is referred to herein as a Group Kaczmarz (GK) approach, which is a modification of the Windowed Kaczmarz (WK) approach. A Randomized Kaczmarz (RK) method converges to an optimum solution exponentially in expectation for a system of linear equations with no corrupted equations. If some equations are noisy, i.e., their results are deviated from the correct results with some small errors such as by introduction of corrupted data from a Byzantine attacker modifying the packets with small margins, RK converges to the least-squares solution. A WK method has been proposed for a case in which some of the equations are corrupted, i.e., their result values are deviated from the correct result values with large margins such as would be the case for data retrieved from a compromised storage node. However, the GK approach presented herein modifies the WK approach followed by application of RK. The GK approach has been found to outperform the WK approach in the context of a distributed storage system. In the following, the GK approach is described and thereafter the algorithm for robusifying a secure distributed edge node storage system against Byzantine attacks using GK is described.

Following the foregoing example in which a linear set of equations in the form of Ax=b+e can be constructed for recreation of a file F from retrieved packets of key information and file information, A may be a matrix of coefficients for the system of linear equations and x is a vector of unknowns. Furthermore, b is a vector of results. In this regard, the equation Ax−b is equal to a zero vector if b is not corrupted. Otherwise, i.e., in the case of at least one corrupted node, b is equal to a non-zero vector. In the methods related to storage of packets of information for a file F in a system of distributed edge storage nodes, x represents the vector of keys and file partitions, A is the matrix of coefficients of keys and file partitions used in generating packets to be stored in storage nodes, and b is the vector of values retrieved from the storage nodes by the authorized user. For a malicious storage node $s_i$, an inequality of $A_j x \neq b_j, j \in \mathcal{J}_i$ is satisfied, where $A_j$ is the $j^{th}$ row of matrix A, $b_j$ is the $j^{th}$ element of vector x, and $\mathcal{J}_i$ is the set of indices of rows of matrix A corresponding to the blocks of the packet stored in the storage node $s_i$. In the GK approach, as shown as an algorithmic definition in FIG. 7, malicious nodes are detected. In turn, corresponding corrupted blocks from the corrupted nodes are omitted from the system of linear equations and the remaining packets from nodes not detected to be corrupted are used to retrieve the keys and file partitions.

The WK algorithm is based on applying RK on A and b for a number (k) of iterations to obtain the matrix $x_k$. Then the residuals of subtracting elements of vector b from the vector $Ax_k$ are calculated and d largest residuals are identified. That is, the WK approach performs an iteration of a solution to determine residual errors relative to the convergent solution for each input into the system of equations. In turn, the equations corresponding to the d largest residuals are identified as corrupted and, in a subsequent iteration of a solution of the linear equation system, the remaining equations without the equations identified as corrupted are used to either (i) further iterate a solution and identify further corrupted equations or (ii) extract the unknowns as a solution (e.g., with sufficiency low residual error in the system). However, system performance can be improved by using GK as compared to the brute force application of WK on all equations obtained from all blocks of packets stored in all storage nodes.

In the GK approach, the average of residuals over all blocks of the packet stored in a specific storage node $s_i$ are calculated. After calculating these average residuals for all storage nodes (i.e., all nodes $s_i$, i∈N), the d storage nodes with largest average residuals are identified as malicious nodes. That is, in contrast to the WK approach in which corrupted equations (i.e., individual inputs to the system of equations) are identified as corrupt, the GK approach leverages the understanding of the context of the distributed edge storage system that if a given storage node is corrupted, all retrieved packets from that corrupted storage node are also likely corrupted, or at a minimum, suspicious. Thus, the calculation of the average residual for a given node (which may contribute a number of blocks that create multiple inputs or equations to the system) allows for identification of corrupted nodes such that all information contributed to the system of equations from that node may be omitted from the system as being corrupt. Thus, identification of a corrupt node from the average residual error may be used to omit a number of equations from the system, whose inputs are all retrieved from the d nodes identified as corrupt based on the average residual values.

In turn, in a subsequent iteration of the GK approach, all blocks corresponding to the detected malicious storage nodes are omitted from the system. Accordingly the process of detecting corrupted nodes using the GK approach is continued iteratively until $k_b Z_b$ packets are detected as corrupted or equivalently $k_b Z_b$ nodes are detected as malicious. Note that according to the Byzantine attacks model, at most $Z_b$ packets are corrupted and $k_b$ is a system parameter that is determined as an assurance margin to detect more packets as corrupted for the case that some correct packets are among those packets that are detected as corrupted.

Eventually, all blocks of the packets detected as corrupted are removed from the system of linear equations and RK is applied to the remaining equations to obtain the vector of unknowns, which are keys and file partitions that may be used to reconstruct the file F. Note that using RK helps to capture potential small corruptions that are applied by a malicious node which might not have been captured by calculating the average residuals. The algorithm shown in FIG. 7 summarizes the steps of GK.

Figure 8:
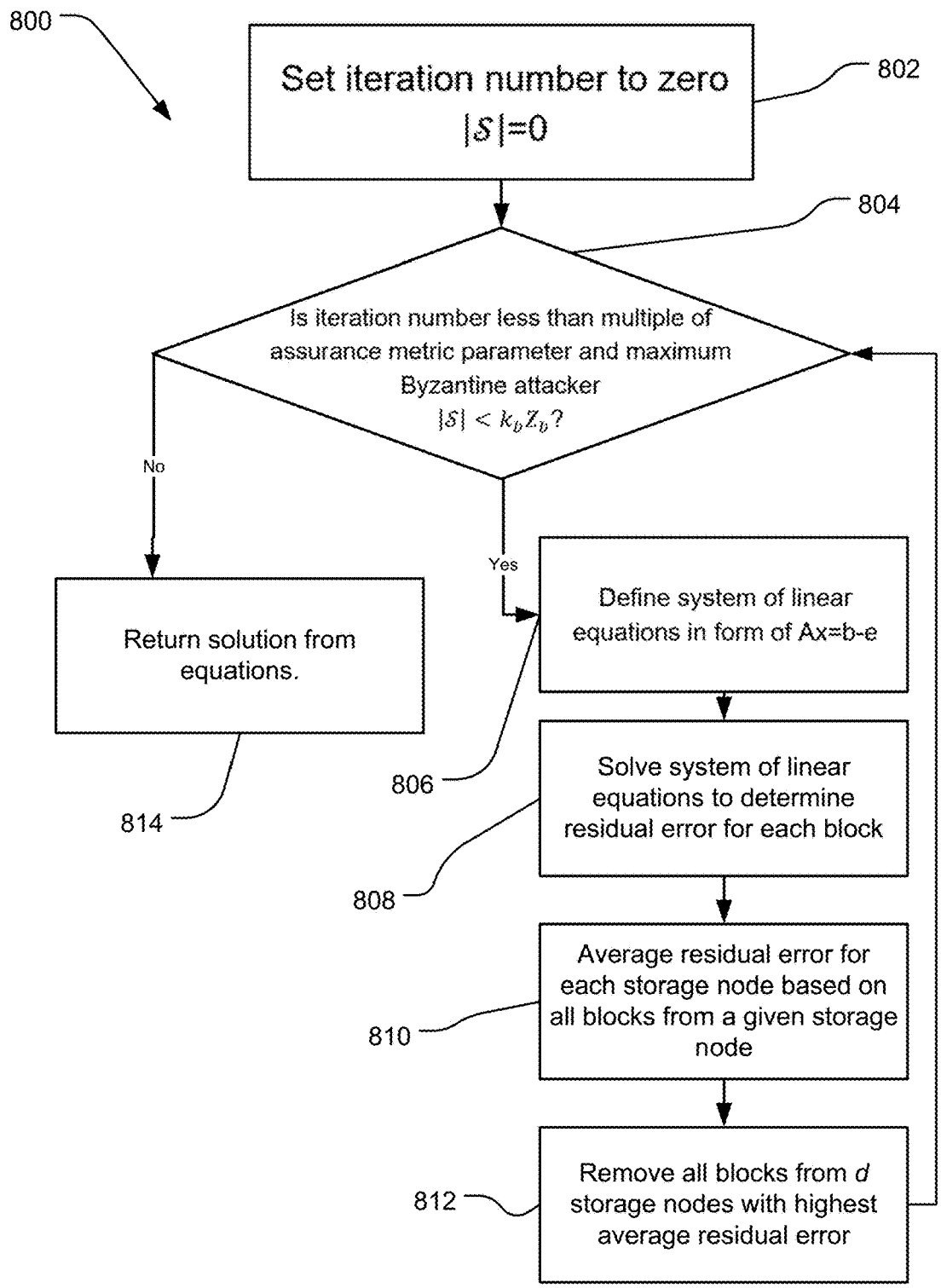
FIG. 8 is an example flow chart for performing a Group Kaczmarz approach to recover file information from packets retrieved from edge storage nodes.

FIG. 8 depicts example operations 800 for application of the GK approach in a distributed edge storage system. At an initialization operation 802, an iteration number is set to zero. At an iteration counter operation 804, it is determined whether the current iteration number is less than an assurance margin parameter $k_b$ multiplied by $Z_b$. If the iteration number is less than the assurance margin parameter multiplied by $Z_b$, a defining operation 806 defines a system of linear equations for the solution to the retrieved packets as described above in the form of Ax=b−e. A solving operation 808 attempts to solve the system of linear equations. As described above, the use of redundant information may allow for creation of an overprovisioned system for the linear equations. Thus, the solving operation 808 may include iterating using the over provisioned system such that a residual error value for each block of data from a storage node may be calculated. An averaging operation 810 averages the residual error for each storage node based on the individual residual errors for each block from the given storage node. That is, the average residual error for a given storage node may be determined based on the residual errors of each individual block retrieved from the given storage node. In turn, a removal operation 812 removes all blocks from the linear equation system from a given number (d) of storage nodes with the highest average residual error. The parameter d may be a design parameter of the system chosen to be greater than one.

The operations 800 may add to the iteration number after each removal operation 812 and continue until the iteration number is equal to the assurance margin parameter multiplied by $Z_b$, at which time a soling operation 814 returns a solution from the linear equations using the remaining blocks from the storage nodes not removed by a removing operation 812.

As mentioned above, $k_b$ is a design parameter that may be adjusted by a system designer to balance system performance relative to robustness against corrupted information in the system. As such, the effect of choosing the assurance margin parameter $k_b$ on the performance of WK for an example scenario compared with WK and an optimum solution is shown in FIG. 9.

Figure 9:
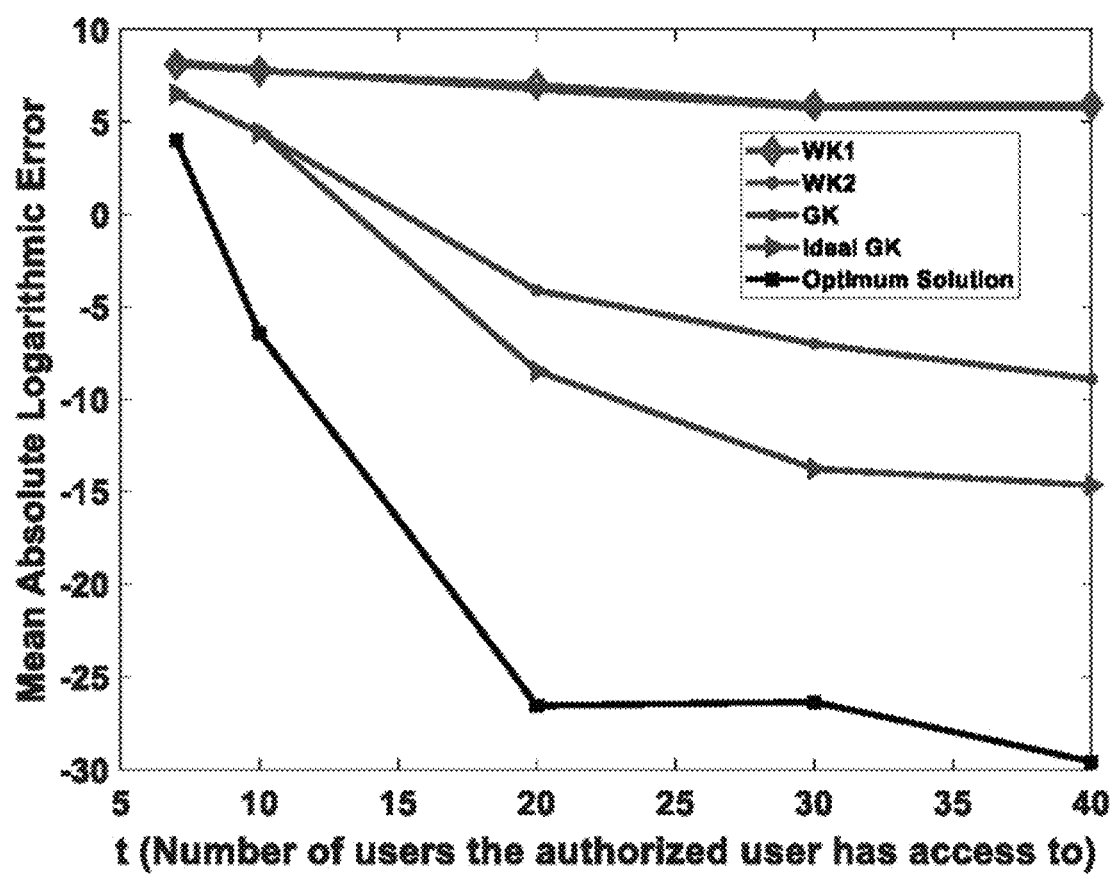
FIG. 9 is an example of a chart relating mean absolute error relative to a number of random edge storage nodes to which an authorized user has access in an edge storage system.

Specifically, FIG. 9 shows the performance of GK as compared to WK and an optimum solution (in which the corrupted blocks are known a priori). The system model reflected in the plot in FIG. 9 is designed for the number of storage nodes N=50 and the maximum number of nodes eavesdropping adversary has access to $Z_e$=3. Each point in the plot is obtained by the authorized user having access to t storage nodes from which $Z_b$=3 are malicious, i.e., corrupted packets. A log of sum of absolute errors over all unknowns is calculated and averaged over 100 random experiments. At each random experiment, $Z_b$=3 random nodes are selected as malicious and each packet stored at a malicious node is corrupted by adding a random error to the blocks. The error ranges from subtracting 50% to adding 1000% of the actual values. The GK approach used for the simulation follows the algorithm details shown in FIG. 7 with parameters k=20, $k_b$=3, and d=1.

A number of other plotted baselines are used to evaluate the performance of GK including WK1, WK2, Ideal GK, and the optimum solution. WK1 applies the WK method on the blocks received from packets of the t selected nodes until a block or blocks from $Z_b$ nodes are detected as corrupted. Then, the blocks detected as corrupted are omitted and RK with 20,000 iterations are applied on the remaining blocks.

WK2 applies the WK method on the blocks received from packets of the t selected nodes until a block or blocks from $Z_b$ nodes are detected as corrupted. Then, any node with at least one corrupted block is detected as malicious. In contrast to WK1, all blocks of the nodes detected as malicious are omitted and RK with 20,000 iterations are applied on all blocks from the remaining nodes only.

The Ideal GK plot applies GK with different values of the assurance measure parameter $k_b$ in the range of two to seventeen and selects the assurance measure parameter $k_b$ with the best performance for each point in the graph.

The optimum solution is a non-realistic solution with the assumption that the malicious nodes are known a priori by the authorized user and RK with 20,000 iterations is applied on the blocks received from the non-malicious nodes. This is not a valid assumption for a practical solution given that a priori knowledge of corrupted nodes is not available in real-world contexts, however, this can be used as a reflection of a lower bound on the error when RK is applied on the non-corrupted blocks.

As seen in FIG. 9, WK2 slightly outperforms WK1 with negligible performance improvement, which is achieved by omitting all blocks of packets from which at least one block is detected as corrupted instead of throwing away only corrupted packets. This slight improvement implies that by taking advantage of the correlation on the state of being corrupted or not among the blocks of one specific packet, the probability of detecting corrupted packets and malicious nodes will be increased, however, still brute force application of WK is not an appropriate approach to capture this correlation. Therefore, GK captures this correlation efficiently and thus significantly outperforms WK1 and WK2. This demonstrates that calculating the average of residuals over all blocks of each packet instead of calculating the residuals of each single block and using this average as the metric to detect malicious nodes provides significant performance improvement to the WK method. In other words, in GK the average distance between the intermediate solution and the blocks related to a node is the metric to identify a malicious node, while in WK the distance between the intermediate solution and each block is the metric to identify the corrupted packets for WK1 or the malicious nodes for WK2.

With larger values of the assurance metric parameter $k_b$, it is more probable that a malicious node is detected by GK (i.e., increasing the positive true rate), with the risk of detecting an honest node as malicious (i.e., increasing the positive negative rate) and omitting valid packets from the set of packets, which degrades the performance of RK applied in the last step of GK. Therefore, as another baseline, different values of $k_b \in \{2, 3, \ldots, 17\}$ for each t was performed and the optimal $k_b$ was used for the Ideal GK plot. As seen by selecting the best $k_b$, allows for reduced logarithmic error by up to 5 points. Note that GK uses the fixed value for the assurance metric parameter $k_b = 3$ for different values of t. Thus, while Ideal GK is not realistic, the plot for Ideal GK does show that the performance gap between a GK with a static value for $k_b$ chosen by a system designer provides little difference to the Ideal GK solution. Another useful baseline to evaluate the performance of GK is the optimum solution, where RK is applied on the non-corrupted packets. As seen, GK performs close to the performance bounds for Ideal GK and the optimum solution, particularly in view of the performance of WK1 and WK2.

Figure 12:
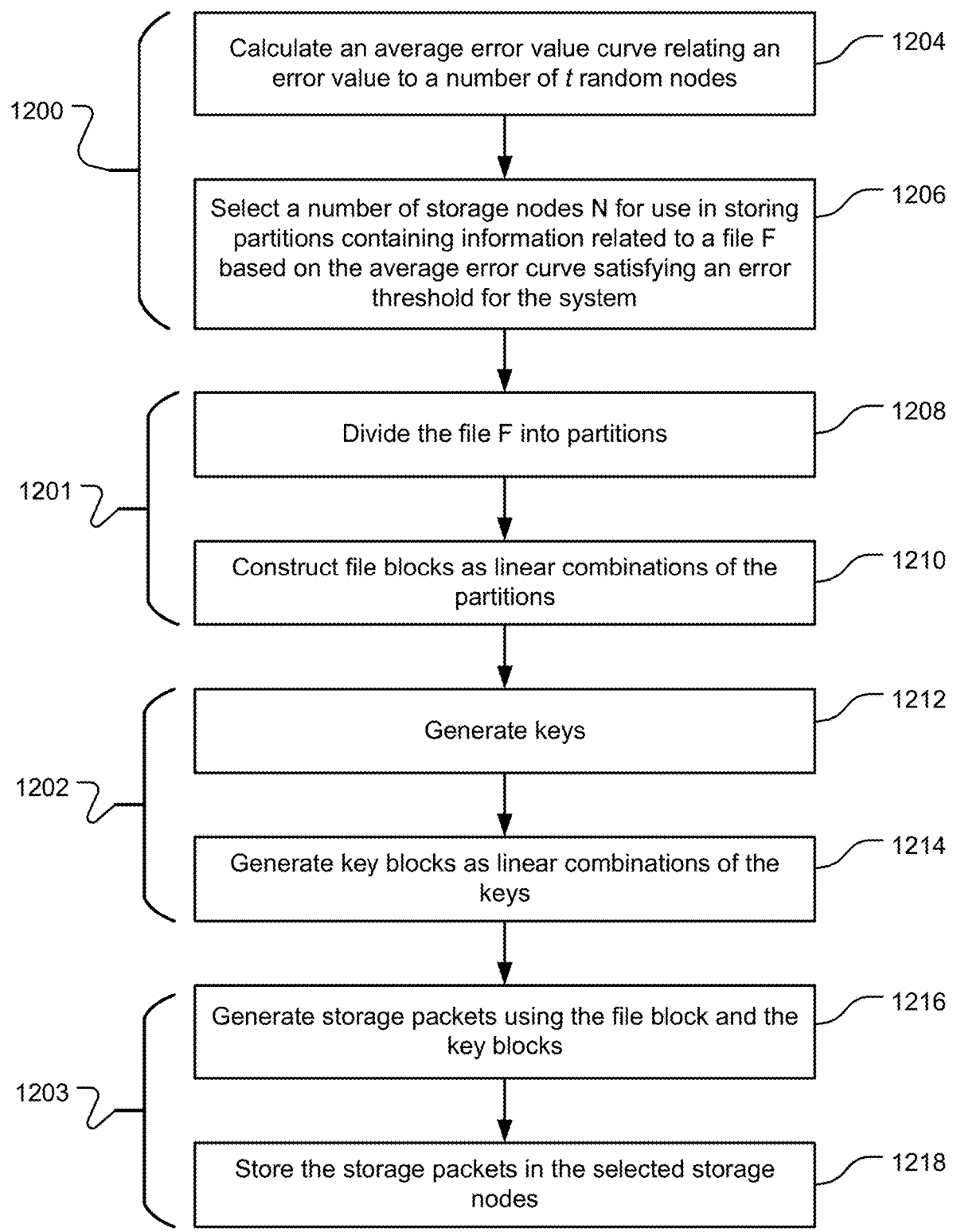
FIG. 12 is an example flow chart for storage of data in a distributed edge storage system to provide resiliency to one or more Byzantine adversary.

With returned reference to system design for processing a file F for storage in a plurality of distributed edge nodes, the flowchart of FIG. 12 includes the following stages: storage node selection 1200, file partition and constructing file blocks 1201, key generation and constructing key blocks 1202, and packet generation 1203. As compared to prior approaches that are not robust against Byzantine attackers, in the present approach, the storage selection differs to accommodate a system that is robust against Byzantine attackers. Specifically, as it is contemplated that some of the blocks retrieved from the distributed storage nodes will be corrupted, initial distribution of the blocks used to reconstruct the file requires that additional redundant data be distributed. Therefore, the minimum required number of storage nodes is dependent on the acceptable error for our application.

In the first stage 1200, a subset of all candidate storage nodes is selected to store file F distributedly. For this purpose, a graph of error relative to the value of t (the number of storage nodes that the authorized user has access to), such as that shown in FIG. 9 for an example scenario, is obtained by calculating 1204 the average error for each value of t. That is, for a selected set of storage node $\mathcal{N}$, t random storage nodes are selected at each iteration and the average error over iterations are calculated. This process is repeated for different values of t and the graph is drawn based on the calculated error relative to different values of t. The storage node set is then selected 1206 such that the obtained graph for the selected set satisfies the system requirements related to the average error for a specific value of t is less than or equal to the acceptable error. After selecting 1206 the set of storage nodes, in a second stage 1201, the file F is divided 1208 into partitions and file blocks are constructed 1210 as the linear combinations of the file partitions, where file blocks are used to add redundancy. In the third stage 1202, keys are generated 1212 and key blocks are constructed 1214 as the linear combinations of the generated keys, where key blocks are used to mask the file partitions. In the fourth stage 1203, the constructed file blocks and key blocks are used to generate 1216 storage packets and store 1218 the storage packets in the set of selected storage nodes.

Figure 11:
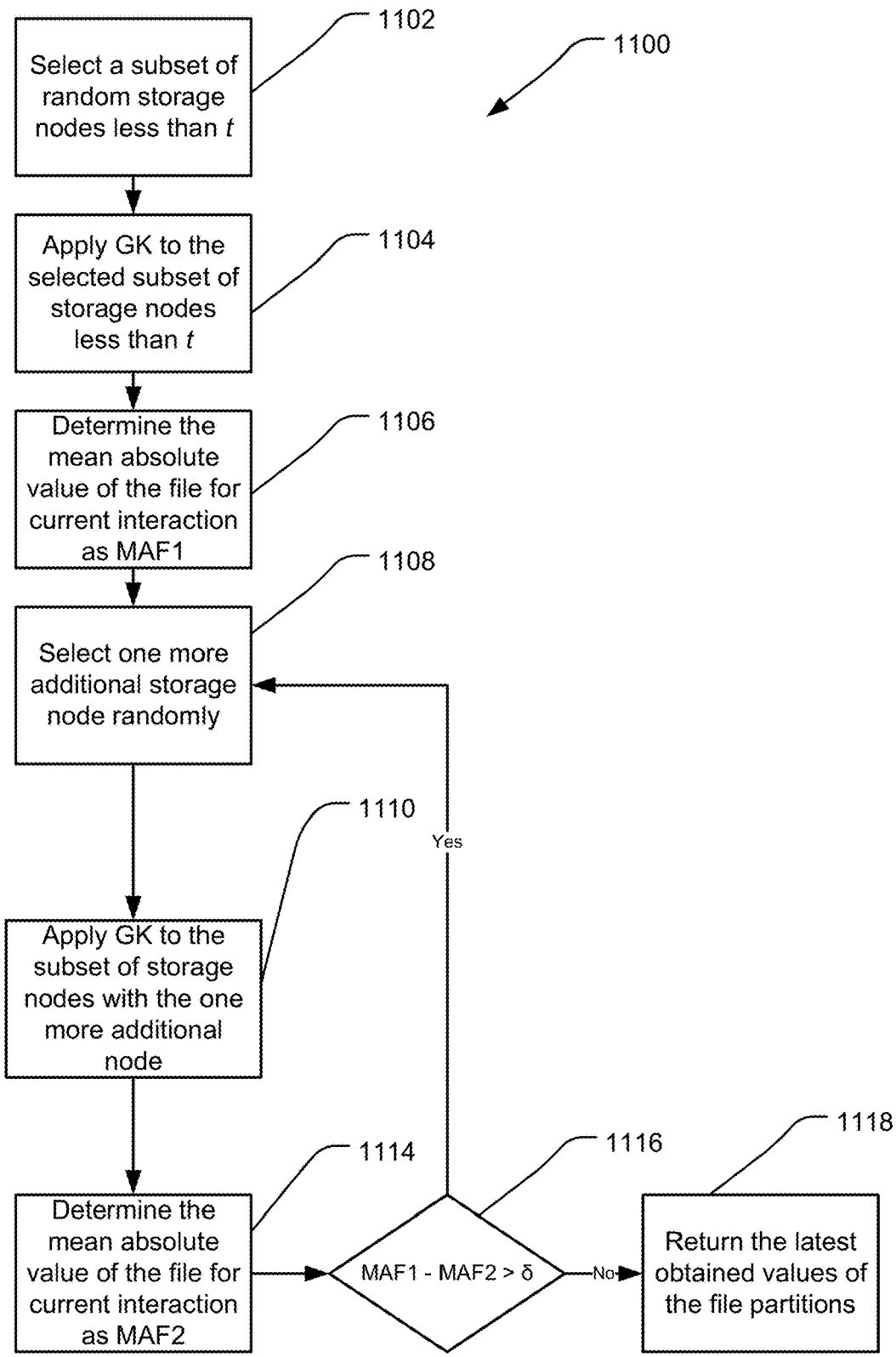
FIG. 11 is an example flow chart for retrieving values of file partitions from edge storage nodes with resiliency to Byzantine adversaries.

With further reference to FIG. 10, an algorithm for retrieval of data from distributed edge storage nodes is shown. This approach systematically recovers from corrupted packets and extracts the keys and file partitions within acceptable error range. One example application of such an algorithm to recover a file in a distributed edge storage system is shown in the example operations 1100 in FIG. 11. In the operations 1100 to recover data, first a subset of random storage nodes less than t (e.g., t-ϵ storage nodes) are selected 1102 randomly. The GK approach (e.g., as described in relation to FIGS. 7 and 8 as described above) is applied 1104 on the packets retrieved from the subset of storage nodes. Note that t is the system parameter that is determined based on the system requirement. For example, a distributed storage system may be designed such that the average error for t is less than or equal to an acceptable error as determined by the system administrator (e.g., using the chart in FIG. 9). In the retrieval algorithm of FIG. 11 less than t storage nodes are selected for the first round, i.e., selecting t-ϵ allows for determining if fewer than t nodes can be used to decode file partitions by having access to less than t nodes. For the randomly selected nodes, a mean absolute value (MAF1) for the current iteration is determined 1106. In turn, a selection 1108 of one additional storage node is made randomly. That is, this approach includes iteratively adding one more storage nodes and includes the packets received from the added storage nodes to the set of packets on which GK is applied. Thus, the operations 1100 include applying 1110 the GK approach to the new subset of storage nodes with the additional random node. A new mean absolute value (MAF2) is determined 1114. A comparing operation 1116 compares the difference between the mean absolute value of the prior iteration (MAF1) to the mean absolute value of the current iteration (MAF2). If the difference between MAF1 and MAF2 is greater than an iteration parameter (δ), the operations continues iteratively until no further improvement is achieved as determined by the difference between MAF1 less MAF2 being less than δ, which is a selectable parameter by the system designer. Once such a condition is achieved, the operations 1100 include returning 1118 the latest values of the file partition retrieved from the application of the GK approach to the latest subset of storage nodes.

Figure 13:
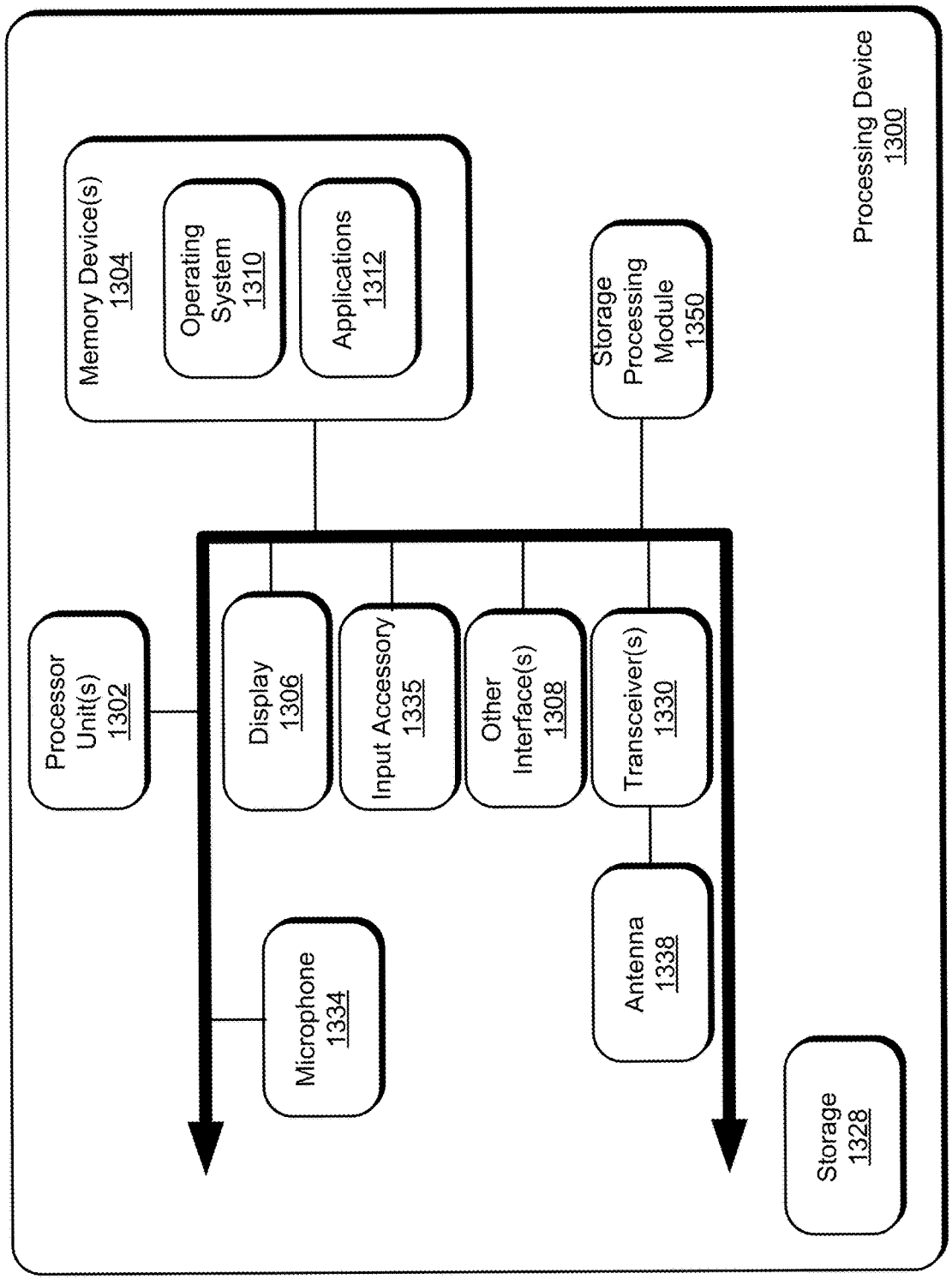
FIG. 13 depicts an example processing device for execution of aspects of the present disclosure.

FIG. 13 illustrates an example schematic of a processing device 1300 suitable for implementing aspects of the disclosed technology. For instance, the processing device 1300 may include a storage processing module 1350 that comprises a storage processing apparatus as described above. Accordingly, the processing device 1300 may comprise the storage processing apparatus for purposes of processing a file according to any of the foregoing discussion. The processing device 1300 includes one or more processor unit(s) 1302, memory 1304, a display 1306, and other interfaces 1308 (e.g., buttons). The memory 1304 generally includes both volatile memory (e.g., RAM) and nonvolatile memory (e.g., flash memory). An operating system 1310, such as the Microsoft Windows® operating system, the Apple macOS operating system, or the Linux operating system, resides in the memory 1304 and is executed by the processor unit(s) 1302, although it should be understood that other operating systems may be employed.

One or more applications 1312 are loaded in the memory 1304 and executed on the operating system 1310 by the processor unit(s) 1302. Applications 1312 may receive input from various input local devices such as a microphone 1334, input accessory 1335 (e.g., keypad, mouse, stylus, touchpad, joystick, an instrument mounted input or the like). Additionally, the applications 1312 may receive input from one or more remote devices such as remotely-located smart devices by communicating with such devices over a wired or wireless network using more communication transceivers 1330 and an antenna 1338 to provide network connectivity (e.g., a mobile phone network, Wi-Fi®, Bluetooth®). The processing device 1300 may also include various other components, such as a positioning system (e.g., a global positioning satellite transceiver), one or more accelerometers, one or more cameras, an audio interface (e.g., the microphone 1334, an audio amplifier and speaker and/or audio jack), and storage devices 1328. Other configurations may also be employed.

The processing device 1300 further includes a power supply 1316, which is powered by one or more batteries or other power sources and which provides power to other components of the processing device 1300. The power supply 1316 may also be connected to an external power source (not shown) that overrides or recharges the built-in batteries or other power sources.

An example implementation may include hardware and/or software embodied by instructions stored in the memory 1304 and/or the storage devices 1328 and processed by the processor unit(s) 1302. The memory 1304 may be the memory of a host device or of an accessory that couples to the host.

The processing system 1300 may include a variety of tangible processor-readable storage media and intangible processor-readable communication signals. Tangible processor-readable storage can be embodied by any available media that can be accessed by the processing system 1300 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 1300. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

One general aspect of the disclosure includes A method for secure distributed storage of information regarding a file in a plurality of distributed edge storage nodes. The method includes selecting a value $Z_e$ such that an eavesdropping attacker having access to $Z_e$ storage nodes is unable to decode any partial information of a file of size |F| stored in a network that distributedly stores the file in more than the $Z_e$ storage nodes. The method also includes selecting a value $Z_b$ such that corrupt data packets from $Z_b$ storage nodes may be corrected by application of an error correction code to information retrieved from the storage nodes. The method includes selecting N* of the storage nodes that minimizes a cost function that includes |F|, $Z_e$, $Z_b$ an initial data access cost $C_T$, and a transmission and downloading cost $C_d$. The method includes initially allocating equal memory sizes from the N* of the storage nodes to store the file, redundant error correction data, and a set of linear code keys. The method also includes iteratively determining a first cost of adding more storage nodes to the N* storage nodes and a second cost of allocating more memory from a subset of the N* storage nodes. The method includes constructing the redundant data packets based on application of an error correcting code to the set of linear code keys and partitions of the file masked with the set of linear code keys and, based on a minimal cost determined from the iterative determinations, storing the file, linear code keys, and redundant data packets in N≥N* of storage nodes. The storage nodes are ordered from largest to smallest by storage capacity such that the largest $Z_e$ storage nodes store the linear code keys, the smallest $N-Z_e-2Z_b$ storage nodes store the partitions of the file, and the redundant packets are stored in the remaining $2Z_b$ storage nodes.

Implementations may include one or more of the following features. For example, at least two of the N storage nodes may allocate different sizes of memory for storing the file. The N storage nodes may be ordered from a largest storage capacity at the first storage node to a smallest capacity at the $\text{Nt}^h$ storage node.

In an example, the cost function comprises the equation $NC_T+(Z_e|\mathcal{P}_{s,max}|+|F|+2Z_b|\mathcal{P}_{s,max}|)C_d$. In one example, N* is selected according to $$\sqrt{\frac{(Z_e+2Z_b)|F|C_d}{C_T}}+(Z_e+2Z_b)$$

rounded to an integer.

In an example, a redundant amount of data $2Z_b|\mathcal{P}_{s,max}|$ is stored in the $2Z_b$ storages. The redundant data may be generated by a generator matrix of the error correcting code multiplied with a vector consisting of the linear code keys and the file partitions masked with the linear code keys In an example, the method may also include retrieving data packets from the storage nodes and applying an (n, k) error correcting code to the data packets.

Another general aspect of the disclosure includes a distributed secure edge storage system. The system includes a network interface operable to access a network having a plurality of edge storage nodes. A storage processing apparatus is coupled to the network. The storage processing apparatus is operable to select a value $Z_e$ such that an eavesdropping attacker having access to $Z_e$ storage nodes is unable to decode any partial information of a file of size |F| stored in a network that distributedly stores the file in more than the $Z_e$ storage nodes. The storage processing apparatus also selects a value $Z_b$ such that corrupt data packets from $Z_b$ storage nodes may be corrected by application of an error correction code to information retrieved from the storage nodes. The storage processing apparatus is operative to select N* of the storage nodes that minimizes a cost function that includes |F|, $Z_e$, $Z_b$, an initial data access cost $C_T$, and a transmission and downloading cost $C_d$. The storage processing apparatus initially allocates equal memory sizes from the N* of the storage nodes to store the file, redundant error correction data, and a set of linear code keys. In turn, the storage processing apparatus iteratively determines a first cost of adding more storage nodes to the N* storage nodes and a second cost of allocating more memory from a subset of the N* storage nodes and constructs the redundant data packets based on application of the error correcting code to the set of linear code keys and partitions of the file masked with the set of linear code keys. The storage processing apparatus also stores the file, linear code keys, and redundant data packets in N≥N* of storage nodes based on a minimal cost determined from the iterative determinations. The storage nodes are ordered from largest to smallest by storage capacity such that the largest $Z_e$ storage nodes store the linear code keys, the smallest $N-Z_e-2Z_b$ storage nodes store the partitions of the file, and the redundant packets are stored in the remaining $2Z_b$ storage nodes.

Implementations may include one or more of the following features. For example, at least two of the N storage nodes may allocate different sizes of memory for storing the file. In this regard, the N storage nodes may be ordered from a largest storage capacity at the first storage node to a smallest capacity at the $N^{th}$ storage node.

In an example, the cost function comprises the equation $NC_T+(Z_e|\mathcal{P}_{s,max}|+|F|+2Z_b|\mathcal{P}_{s,max}|)C_d$. The value of N* may be selected according to $$\sqrt{\frac{(Z_e+2Z_b)|F|C_d}{C_T}}+(Z_e+2Z_b)$$

rounded to an integer. A redundant amount of data $2Z_b|\mathcal{P}_{s,max}|$ may be stored in the remaining $2Z_b$ storages. The redundant data may be generated by a generator matrix of the error correcting code multiplied with a vector consisting of the linear code keys and the file partitions masked with the linear code keys In an example, the storage processing apparatus is further operative to retrieve data packets from the storage nodes and apply an (n, k) error correcting code to the data packets.

Another general aspect of the present disclosure includes one or more tangible processor-readable storage media embodied with instructions for executing on one or more processors and circuits of a device a process for secure distributed storage of information regarding a file in a plurality of distributed edge storage nodes. The process includes selecting a value $Z_e$ such that an eavesdropping attacker having access to $Z_e$ storage nodes is unable to decode any partial information of a file of size |F| stored in a network that distributedly stores the file in more than the $Z_e$ storage nodes. The process also includes selecting a value $Z_b$ such that corrupt data packets from $Z_b$ storage nodes may be corrected by application of an error correction code to information retrieved from the storage nodes. The process further includes selecting N* of the storage nodes that minimizes a cost function that includes |F|, $Z_e$, $Z_b$, an initial data access cost $C_T$, and a transmission and downloading cost $C_d$. In turn, the process includes initially allocating equal memory sizes from the N* of the storage nodes to store the file, redundant error correction data, and a set of linear code keys and iteratively determining a first cost of adding more storage nodes to the N* storage nodes and a second cost of allocating more memory from a subset of the N* storage nodes. The redundant data packets are constructed based on application of an error correcting code to the set of linear code keys and partitions of the file masked with the set of linear code keys. Based on a minimal cost determined from the iterative determinations, the process includes storing the file, linear code keys, and redundant data packets in N≥N* of storage nodes. The storage nodes being ordered from largest to smallest by storage capacity such that the largest $Z_e$ storage nodes store the linear code keys, the smallest $N-Z_e-2Z_b$ storage nodes store the partitions of the file, and the redundant packets are stored in the remaining $2Z_b$ storage nodes.

Implementations may include one or more of the following features. For example, at least two of the N storage nodes may allocate different sizes of memory for storing the file. In this regard, the N storage nodes may be ordered from a largest storage capacity at the first storage node to a smallest capacity at the $N^{th}$ storage node.

In an example, the cost function may include the equation $NC_T+(Z_e|\mathcal{P}_{s,max}|+|F|+2Z_b|\mathcal{P}_{s,max}|)C_d$. The value of N* may be selected according to $$\sqrt{\frac{(Z_e+2Z_b)|F|C_d}{C_T}}+(Z_e+2Z_b)$$

rounded to an integer. A redundant amount of data $2Z_b|\mathcal{P}_{s,max}|$ may be stored in the remaining $2Z_b$ storages. In an example, the redundant data is generated by a generator matrix of the error correcting code multiplied with a vector consisting of the linear code keys and the file partitions masked with the linear code keys.

In an example, the process further comprises retrieving data packets from the storage nodes and applying an (n, k) error correcting code to the data packets.

Another general aspect of the present disclosure includes a method for secure distributed storage of information regarding a file in a plurality of distributed edge storage nodes. The method includes selecting N storage nodes that are coupled via a network to store a file of size |F| and redundancy data of size $|F_{red}|$. At least two of the N storage nodes allocate different sizes of memory for storing the file. In turn, the N storage nodes are ordered from a largest storage capacity $|s_1|$ at the first storage node to a smallest capacity $|s_N|$ at the $N^{th}$ storage node. The N storage nodes are at least in part based on an average error calculation for a number of t random nodes selected from N for a maximum number of $Z_b$ corrupted nodes. The method also includes selecting a value $Z_e<N$ where an attacker having access to $Z_e$ storage nodes is unable to decode the file. The method also includes dividing the file into file partitions, generating keys that are stored in the first $Z_e$ of the N storage nodes, and creating storage blocks comprising independent linear combinations of the keys and the file partitions. In turn, the method includes storing the storage packets comprising independent linear combinations of the keys and the file partitions in the $Z_e+1$ to $N^{th}$ storage nodes.

Implementations may include one or more of the following features. For example, the storage blocks may include a first part that is a function of the file partitions and a second part that is a function of the keys.

The method may also include calculating the average error calculation for a number of t random nodes selected from N for $Z_b$ corrupted nodes for different values of t. The method also includes establishing an acceptable error value. In turn, the value of N is selected such that the average error calculation for t random nodes for the N selected nodes is less than the acceptable error.

In an example, the method includes retrieving data for the file F by an authorized user by selecting a subset of the N storage nodes less than t and retrieving storage packets from the subset of the N storage nodes comprising independent linear combinations of keys and file partitions masked by keys from each respective node of the subset t of the N storage nodes. The method also includes establishing a plurality of linear equations equating coefficients of the linear key codes used to generate the file portions masked by the linear key codes with the retrieved values. A mean residual error for each respective storage node of the subset of the N storage nodes may be determined. In turn, the method may include removing a selected number of storage nodes from the subset of the storage nodes having a largest mean residual error of the subset of the storage nodes. The method may include iteratively performing the establishing, determining, and removing operations for a predetermined number of iterations and extracting the values of the file portions from the plurality of linear equations of a final iteration. The predetermined number of iterations may be on an assurance margin parameter $k_b$ and the maximum number of $Z_b$ corrupted nodes.

In an example, the retrieving operation further comprises adding one more random storage node to the subset of the N storage nodes and extracting the values of the file portion from the plurality of linear equations. The method may also include calculating a first mean absolute error of a prior iterations of the subset of the N storage nodes and a second mean absolute error of a current iteration of the subset of the N storage nodes including the one more random storage node. The method further includes determining if a difference between the first mean absolute error and the second mean absolute error is below an iteration threshold. While the difference between the first mean absolute error and the second mean absolute error is above an iteration threshold, the method may include continuing to iterate by adding one additional storage node to the subset of the N storage nodes. When the difference between the first mean absolute error and the second mean absolute error is below an iteration threshold, the method may include reconstructing the file from file information extracted from the solution to the plurality of linear equations from the last iteration of a solution to the plurality of linear equations.

Another general aspect includes a distributed secure edge storage system. The system includes at least N storage nodes that are coupled via a network to store a file of size |F| and redundancy data of size $|F_{red}|$. At least two of the N storage nodes allocate different sizes of memory for storing the file. The N storage nodes are ordered from a largest storage capacity $|s_1|$ at the first storage node to a smallest capacity $|s_N|$ at the $N^{th}$ storage node. The N storage nodes are at least in part based on an average error calculation for a number of t random nodes selected from N for a maximum number of $Z_b$ corrupted nodes. The system also includes a storage processing apparatus coupled to the network and operable to select a value $Z_e<N$, wherein an attacker having access to $Z_e$ storage nodes is unable to decode the file. The storage processing apparatus is also operative to divide the file into file partitions, generate keys that are stored in the first $Z_e$ of the N storage nodes, and create storage blocks comprising independent linear combinations of the keys and the file partitions. The storage processing apparatus is further operative to store the storage packets comprising independent linear combinations of the keys and the file partitions in the $Z_e+1$ to $N^{th}$ storage nodes.

Implementations may include one or more of the following features. For example, the storage blocks may include a first part that is a function of the file partitions and a second part that is a function of the keys. Also, the storage processing apparatus may be further operative to calculate the average error calculation for a number of t random nodes selected from N for $Z_b$ corrupted nodes for different values of t and establish an acceptable error value. Accordingly, the value of N may be selected such that the average error calculation for t random nodes for the N selected nodes is less than the acceptable error.

In an example, the storage processing apparatus is further operative to retrieve data for the file F by an authorized user by selecting a subset of the N storage nodes less than t, retrieving storage packets from the subset of the N storage nodes comprising independent linear combinations of keys and file partitions masked by keys from each respective node of the subset t of the N storage nodes, and establishing a plurality of linear equations equating coefficients of the linear key codes used to generate the file portions masked by the linear key codes with the retrieved values. The retrieval of data for the file F may further include determining a mean residual error for each respective storage node of the subset of the N storage nodes and removing a selected number of storage nodes from the subset of the storage nodes having a largest mean residual error of the subset of the storage nodes. The retrieval may include iteratively performing the establishing, determining, and removing operations for a predetermined number of iterations and extracting the values of the file portions from the plurality of linear equations of a final iteration. The predetermined number of iterations may be based on an assurance margin parameter $k_b$ and the maximum number of $Z_b$ corrupted nodes.

In an example, the storage processing apparatus may be further operative to retrieve storage packets by adding one more random storage node to the subset of the N storage nodes and extracting the values of the file portion from the plurality of linear equations. In turn, the storage processing apparatus may be operative to retrieve storage packets by calculating a first mean absolute error of a prior iterations of the subset of the N storage nodes and a second mean absolute error of a current iteration of the subset of the N storage nodes including the one more random storage node and determining if a difference between the first mean absolute error and the second mean absolute error is below an iteration threshold. While the difference between the first mean absolute error and the second mean absolute error is above an iteration threshold, the storage processing apparatus continues to iterate by adding one additional storage node to the subset of the N storage nodes. When the difference between the first mean absolute error and the second mean absolute error is below an iteration threshold, the storage processing apparatus is operative to reconstruct the file from file information extracted from the solution to the plurality of linear equations from the last iteration of a solution to the plurality of linear equations.

Another general aspect of the present disclosure includes one or more tangible processor-readable storage media embodied with instructions for executing on one or more processors and circuits of a device a process for secure distributed storage of information regarding a file in a plurality of distributed edge storage nodes. The process includes selecting N storage nodes that are coupled via a network to store a file of size $|F|$ and redundancy data of size $|F_{red}|$. At least two of the N storage nodes allocate different sizes of memory for storing the file, the N storage nodes re ordered from a largest storage capacity $|s_1|$ at the first storage node to a smallest capacity $|s_N|$ at the $N^{th}$ storage node, and the N storage nodes are at least in part based on an average error calculation for a number of t random nodes selected from N for a maximum number of $Z_b$ corrupted nodes. The process also includes selecting a value $Z_e < N$, wherein an attacker having access to $Z_e$ storage nodes is unable to decode the file. The process further includes dividing the file into file partitions, generating keys that are stored in the first $Z_e$ of the N storage nodes, and creating storage blocks comprising independent linear combinations of the keys and the file partitions. The process further includes storing the storage packets comprising independent linear combinations of the keys and the file partitions in the $Z_e+1$ to $N^{th}$ storage nodes.

Implementations may include one or more of the following features. For example, the storage blocks may include a first part that is a function of the file partitions and a second part that is a function of the keys.

In an example, the process may also include calculating the average error calculation for a number of t random nodes selected from N for $Z_b$ corrupted nodes for different values of t and establishing an acceptable error value. The value of N may be selected such that the average error calculation for t random nodes for the N selected nodes is less than the acceptable error.

In an example, the process further includes retrieving data for the file F by an authorized user. The retrieving may include selecting a subset of the N storage nodes less than t and retrieving storage packets from the subset of the N storage nodes comprising independent linear combinations of keys and file partitions masked by keys from each respective node of the subset t of the N storage nodes. The retrieving may include establishing a plurality of linear equations equating coefficients of the linear key codes used to generate the file portions masked by the linear key codes with the retrieved values and determining a mean residual error for each respective storage node of the subset of the N storage nodes. The process may include removing a selected number of storage nodes from the subset of the storage nodes having a largest mean residual error of the subset of the storage nodes and iteratively performing the establishing, determining, and removing operations for a predetermined number of iterations. In turn, the process may include extracting the values of the file portions from the plurality of linear equations of a final iteration. The predetermined number of iterations may be on an assurance margin parameter $k_b$ and the maximum number of $Z_b$ corrupted nodes.

In turn, the retrieving operation may also include adding one more random storage node to the subset of the N storage nodes and extracting the values of the file portion from the plurality of linear equations. The retrieving may include calculating a first mean absolute error of a prior iterations of the subset of the N storage nodes and a second mean absolute error of a current iteration of the subset of the N storage nodes including the one more random storage node and determining if a difference between the first mean absolute error and the second mean absolute error is below an iteration threshold. While the difference between the first mean absolute error and the second mean absolute error is above an iteration threshold, the process includes continuing to iterate by adding one additional storage node to the subset of the N storage nodes. When the difference between the first mean absolute error and the second mean absolute error is below an iteration threshold, the process includes reconstructing the file from file information extracted from the solution to the plurality of linear equations from the last iteration of a solution to the plurality of linear equations.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method for secure distributed storage of information regarding a file in a plurality of distributed edge storage nodes, comprising:
    selecting a value $Z_e$ such that an eavesdropping attacker having access to $Z_e$ storage nodes is unable to decode any partial information of a file of size $|F|$ stored in a network that distributedly stores the file in more than the $Z_e$ storage nodes, wherein $Z_e$ is less than all the plurality of distributed edge storage nodes;
    selecting a value $Z_b$ such that corrupt data packets from $Z_b$ storage nodes may be corrected by application of an error correction code to information retrieved from the storage nodes, wherein $Z_b$ is less than all the plurality of distributed edge storage nodes;

selecting N* of the plurality of distributed edge storage nodes that minimizes a cost function that includes |F|, $Z_e$, $Z_b$ an initial data access cost $C_T$, and a transmission and downloading cost $C_d$, and an error correction factor associated with the error correction code;

initially allocating equal memory sizes from the N* of the plurality of distributed edge storage nodes to store the file, redundant error correction data packets, and a set of linear code keys;

iteratively determining a first cost of adding more storage nodes to the N* storage nodes and a second cost of allocating more memory from a subset of the N* storage nodes;

constructing the redundant error correction data packets based on application of the error correcting code to the set of linear code keys and partitions of the file masked with the set of linear code keys; and based on a minimal cost determined from the iterative determinations, storing the file, the linear code keys, and the redundant error correction data packets in $N \geq N^*$ of storage nodes, the storage nodes being ordered from largest to smallest by storage capacity such that the largest $Z_e$ storage nodes store the linear code keys, the smallest $N-Z_e-2Z_b$ storage nodes store the partitions of the file, and the redundant error correction data packets are stored in the remaining $2Z_b$ storage nodes.

2. The method of claim 1, wherein at least two of the N storage nodes allocate different sizes of memory for storing the file, the N storage nodes being ordered from a largest storage capacity at a first storage node to a smallest capacity at an $N^{th}$ storage node.

3. The method of claim 1, wherein the cost function comprises $NC_T+(Z_e|\mathcal{P}_{s,max}|+|F|+2Z_b|\mathcal{P}_{s,max}|)C_d$, wherein $\mathcal{P}_{s,max}$ is a largest sized data package of the file, the linear code keys, and the redundant error correction data packets.

4. The method of claim 1, wherein N* is selected according to $$\sqrt{\frac{(Z_e+2Z_b)|F|C_d}{C_T}} + (Z_e+2Z_b)$$

rounded to an integer.

5. The method of claim 1, wherein a redundant amount of data $2Z_b|\mathcal{P}_{s,max}|$ is stored in the $2Z_b$ storages, wherein $\mathcal{P}_{s,max}$ is a largest sized data package of the file, the linear code keys, and the redundant error correction data packets.

6. The method of claim 5, wherein the redundant error correction data packets are generated by a generator matrix of the error correcting code multiplied with a vector consisting of the linear code keys and the file partitions masked with the linear code keys.

7. The method of claim 1, further comprising:
retrieving data packets from the storage nodes; and
applying an (n, k) error correcting code to the data packets.

8. A distributed secure edge storage system, comprising:
a network interface operable to access a network having a plurality of edge storage nodes;
a storage processing apparatus coupled to the network and operable to:

select a value $Z_e$ such that an eavesdropping attacker having access to $Z_e$ storage nodes is unable to decode any partial information of a file of size |F| stored in a network that distributedly stores the file in more than the $Z_e$ storage nodes, wherein $Z_e$ is less than all the plurality of edge storage nodes;

select a value $Z_b$ such that corrupt data packets from $Z_b$ storage nodes may be corrected by application of an error correction code to information retrieved from the storage nodes, wherein $Z_b$ is less than all the plurality of edge storage nodes;

select N* of the plurality of edge storage nodes that minimizes a cost function that includes |F|, $Z_e$, $Z_b$ an initial data access cost $C_T$, and a transmission and downloading cost $C_d$, and an error correction factor associated with the error correction code;

initially allocate equal memory sizes from the N* of the plurality of edge storage nodes to store the file, redundant error correction data packets, and a set of linear code keys;

iteratively determine a first cost of adding more storage nodes to the N* storage nodes and a second cost of allocating more memory from a subset of the N* storage nodes;

construct the redundant error correction data packets based on application of the error correcting code to the set of linear code keys and partitions of the file masked with the set of linear code keys; and based on a minimal cost determined from the iterative determinations, store the file, the linear code keys, and the redundant error correction data packets in $N \geq N^*$ of storage nodes, the storage nodes being ordered from largest to smallest by storage capacity such that the largest $Z_e$ storage nodes store the linear code keys, the smallest $N-Z_e-2Z_b$ storage nodes store the partitions of the file, and the redundant error correction data packets are stored in the remaining $2Z_b$ storage nodes.

9. The system of claim 8, wherein at least two of the N storage nodes allocate different sizes of memory for storing the file, the N storage nodes being ordered from a largest storage capacity at the first storage node to a smallest capacity at the $N^{th}$ storage node.

10. The system of claim 8, wherein the cost function comprises $NC_T+(Z_e|\mathcal{P}_{s,max}|+|F|+2Z_b|\mathcal{P}_{s,max}|)C_d$, wherein $\mathcal{P}_{s,max}$ is a largest sized data package of the file, the linear code keys, and the redundant error correction data packets.

11. The system of claim 8, wherein N* is selected according to $$\sqrt{\frac{(Z_e+2Z_b)|F|C_d}{C_T}} + (Z_e+2Z_b)$$

rounded to an integer.

12. The system of claim 8, wherein a redundant amount of data $2Z_b|\mathcal{P}_{s,max}|$ is stored in the remaining $2Z_b$ storages, wherein $\mathcal{P}_{s,max}$ is a largest sized data package of the file, the linear code keys, and the redundant error correction data packets.

13. The system of claim 12, wherein the redundant error correction data packets are generated by a generator matrix of the error correcting code multiplied with a vector consisting of the linear code keys and the file partitions masked with the linear code keys.

14. The system of claim 8, wherein the storage processing apparatus is further operative to:
retrieve data packets from the storage nodes; and
apply an (n, k) error correcting code to the data packets.

15. One or more tangible processor-readable storage media embodied with instructions for executing on one or more processors and circuits of a device a process for secure distributed storage of information regarding a file in a plurality of distributed edge storage nodes comprising:
selecting a value $Z_e$ such that an eavesdropping attacker having access to $Z_e$ storage nodes is unable to decode any partial information of a file of size $|F|$ stored in a network that distributedly stores the file in more than the $Z_e$ storage nodes, wherein $Z_e$ is less than all the plurality of distributed edge storage nodes;
selecting a value $Z_b$ such that corrupt data packets from $Z_b$ storage nodes may be corrected by application of an error correction code to information retrieved from the storage nodes, wherein $Z_b$ is less than all the plurality of distributed edge storage nodes;
selecting $N^*$ of the plurality of distributed edge storage nodes that minimizes a cost function that includes $|F|$, $Z_e$, $Z_b$, an initial data access cost $C_T$, and a transmission and downloading cost $C_d$, and an error correction factor associated with the error correction code;
initially allocating equal memory sizes from the $N^*$ of the plurality of distributed edge storage nodes to store the file, redundant error correction data packets, and a set of linear code keys;
iteratively determining a first cost of adding more storage nodes to the $N^*$ storage nodes and a second cost of allocating more memory from a subset of the $N^*$ storage nodes;
constructing the redundant error correction data packets based on application of the error correcting code to the set of linear code keys and partitions of the file masked with the set of linear code keys; and
based on a minimal cost determined from the iterative determinations, storing the file, the linear code keys, and the redundant error correction data packets in $N \geq N^*$ of storage nodes, the storage nodes being ordered from largest to smallest by storage capacity such that the largest $Z_e$ storage nodes store the linear code keys, the smallest $N-Z_e-2Z_b$ storage nodes store the partitions of the file, and the redundant error correction data packets are stored in the remaining $2Z_b$ storage nodes.

16. The one or more tangible processor-readable storage media of claim 15, wherein at least two of the N storage nodes allocate different sizes of memory for storing the file, the N storage nodes being ordered from a largest storage capacity at a first storage node to a smallest capacity at an $N^{th}$ storage node.

17. The one or more tangible processor-readable storage media of claim 16, wherein the cost function comprises $NC_T+(Z_e|\mathcal{P}_{s,max}|+|F|+2Z_b|\mathcal{P}_{s,max}|)C_d$, wherein $\mathcal{P}_{s,max}$ is a largest sized data package of the file, the linear code keys, and the redundant error correction data packets.

18. The one or more tangible processor-readable storage media of claim 17, wherein $N^*$ is selected according to $$\sqrt{\frac{(Z_e+2Z_b)|F|C_d}{C_T}} + (Z_e+2Z_b)$$

rounded to an integer.

19. The one or more tangible processor-readable storage media of claim 15, wherein a redundant amount of data $2Z_b|\mathcal{P}_{s,max}|$ is stored in the remaining $2Z_b$ storages, wherein $\mathcal{P}_{s,max}$ is a largest sized data package of the file, the linear code keys, and the redundant error correction data packets.

20. The one or more tangible processor-readable storage media of claim 19, wherein the redundant error correction data packets are generated by a generator matrix of the error correcting code multiplied with a vector consisting of the linear code keys and the file partitions masked with the linear code keys.

21. The one or more tangible processor-readable storage media of claim 15, wherein the process further comprises:
retrieving data packets from the storage nodes; and
applying an (n, k) error correcting code to the data packets.

* * * * *